(12) United States Patent
Cox, Jr.

(10) Patent No.: US 9,657,248 B1
(45) Date of Patent: May 23, 2017

(54) SYSTEMS, DEVICES, COMPOSITIONS, AND/OR METHODS FOR DE-SULPHURIZING ACID GASES

(71) Applicant: Biosystems Consulting, Inc., Blacksburg, VA (US)

(72) Inventor: Henry Wilmore Cox, Jr., Blacksburg, VA (US)

(73) Assignee: BioSystems Consulting, Inc., Blacksburg, VA (US)

( * ) Notice: Subject to any disclaimer, the term of this patent is extended or adjusted under 35 U.S.C. 154(b) by 265 days.

(21) Appl. No.: 14/657,527

(22) Filed: Mar. 13, 2015

Related U.S. Application Data

(60) Provisional application No. 61/953,051, filed on Mar. 14, 2014.

(51) Int. Cl.

| | | |
|---|---|---|
| *B01D 53/52* | (2006.01) | |
| *C01B 17/04* | (2006.01) | |
| *C01B 17/05* | (2006.01) | |
| *C10L 3/10* | (2006.01) | |
| *B01D 53/86* | (2006.01) | |
| *B01D 53/96* | (2006.01) | |

(52) U.S. Cl.
CPC .......... *C10L 3/103* (2013.01); *B01D 53/8612* (2013.01); *B01D 53/96* (2013.01); *B01D 2255/20738* (2013.01); *C10L 2290/12* (2013.01)

(58) Field of Classification Search
CPC .... B01D 53/1468; B01D 53/52; C01B 17/05; C01B 17/04; C10L 3/102; C10L 3/103
See application file for complete search history.

(56) References Cited

U.S. PATENT DOCUMENTS

| | | | | |
|---|---|---|---|---|
| 3,933,993 A | * | 1/1976 | Salemme | B01D 53/485 423/226 |
| 4,076,621 A | | 2/1978 | Hardison | |
| 4,189,462 A | | 2/1980 | Thompson | |
| 4,781,901 A | * | 11/1988 | Jeffrey | B01D 53/1462 423/226 |
| 4,784,775 A | | 11/1988 | Hardison | |
| 4,969,986 A | * | 11/1990 | McIntyre | B01D 53/1425 204/229.1 |
| 5,004,588 A | * | 4/1991 | Nisula | B01D 53/1418 23/293 S |

(Continued)

FOREIGN PATENT DOCUMENTS

WO    WO 2015/173234 A1 * 11/2015 ............. B01D 53/14

OTHER PUBLICATIONS

Clark, "Gas/Liquid Treatment and Sulphur Recovery", Feb. 19, 2010, 3 pages, Shell Global Solutions; http://s06.static-shell.com/content/dam/shell/static/globalsolutions/downloads/aboutshell/special-supplements/gas-liquid-treatment.pdf.

(Continued)

*Primary Examiner* — Timothy Vanoy
(74) *Attorney, Agent, or Firm* — Michael Haynes PLC; Michael N. Haynes

(57) ABSTRACT

Certain exemplary embodiments can provide a system, machine, device, manufacture, circuit, composition of matter, and/or user interface adapted for and/or resulting from, and/or a method and/or machine-readable medium comprising machine-implementable instructions for, activities that can comprise and/or relate to, reacting reactants comprising a ferric/ferrous chelate and a sour gas stream.

23 Claims, 11 Drawing Sheets

(56) References Cited

U.S. PATENT DOCUMENTS

| | | | | |
|---|---|---|---|---|
| 5,149,459 | A * | 9/1992 | Olson | B01D 53/1418 252/191 |
| 5,167,940 | A | 12/1992 | McManus | |
| 5,648,054 | A * | 7/1997 | DeBerry | B01D 53/1425 423/220 |
| 5,738,834 | A * | 4/1998 | Deberry | B01D 53/1468 422/177 |
| 6,998,099 | B2 | 2/2006 | Hesse | |
| 7,846,408 | B1 * | 12/2010 | Cox, Jr. | C02F 1/725 423/244.01 |
| 8,877,671 | B2 * | 11/2014 | Radlowski | B01J 23/882 502/167 |
| 2002/0094308 | A1 | 7/2002 | Portz | |
| 2004/0241068 | A1 * | 12/2004 | Hesse | B01D 53/1493 423/226 |
| 2013/0123561 | A1 * | 5/2013 | Nagl | B01D 53/8612 585/850 |
| 2015/0005216 | A1 * | 1/2015 | De Wolf | C09K 8/54 510/188 |

OTHER PUBLICATIONS

EPA, "Review of New Source Performance Standards for Petroleum Refinery Fuel Gas", Oct. 1, 1986, pp. 4-8-4-16, US Environmental Protection Agency.

Kohl & Riesenfeld, "Gas Purification", Jan. 1, 1985, pp. 717, 749-753, Gulf Publishing Co, Houston.

U.S. DOE, "Sulfur Recovery and Tail Gas Treating", Mar. 12, 2015, 2 pages, http://www.netl.doe.gov/research/coal/energy-systems/gasification/gasifipedia/scot-tgtu.

Vatachi, "Modified Claus Process Applied to Natural Gas for Sulphur Recovery", Apr. 27, 2011, 6 pages, http://www.afahc.ro/ro/afases/2011/eng/4.4/Vatachi_Popa.pdf.

Wikipedia, "Claus Process", Mar. 11, 2015, 10 pages, http://en.wikipedia.org/wiki/Claus_process.

* cited by examiner

| Time (min) | H2S Out (ppm) | ORP (mV) |
|---|---|---|
| 0 | N/A | 103 |
| 5 | 2 | -73.3 |
| 10 | 1 | -86.3 |
| 15 | 1 | -104.7 |
| 20 | 1 | -119.1 |
| 25 | 1 | -131.8 |
| 30 | 0 | -142.4 |
| 25 | 0 | -151.9 |
| 40 | 0 | -161.2 |
| 45 | 0 | -170.7 |
| 50 | 0 | -179.2 |
| 55 | 0 | -187.5 |
| 60 | 0 | -197.1 |
| 65 | 0 | -208 |
| 70 | 0 | -217 |
| 75 | 0 | -233 |
| 80 | 0 | -252 |
| 85 | 0 | -276 |
| 90 | 0 | -305 |
| 95 | 0 | -337 |
| 100 | 0 | -370 |
| 105 | 0 | -399 |
| 110 | 1 | -425 |
| 115 | 6 | -437 |
| 120 | 19 | -443 |
| 125 | 48 | -450 |
| 130 | 69 | -455 |

FIG. 7

| Oxidant | Amount Added | Beginning pH | End pH | Beginning ORP (mV) | Ending ORP (mV) | Sulfide Start (ppm) | Sulfide End (ppm) |
|---|---|---|---|---|---|---|---|
| Hydrogen Peroxide | 60 mg/L | 7.5 | 7.3 | -430 | -196.1 | 60 | 0 |
| 1M Sodium Percarbonate | 0.2ml | 7.4 | 8.3 | -422 | -159 | 73 | 0 |
| 5% Peracetic Acid | 0.1ml | 8.01 | 7.61 | -428 | -394 | 31 | 93 |
| 31% Sodium Chlorite | 0.1ml | 8.39 | 8.33 | -416 | -286 | 69 | 0 |
| 15.2% Sodium Hypochlorite | 0.1ml | 8.15 | 8.07 | -417 | -422 | 49 | 53 |

FIG. 8

SYSTEMS, DEVICES, COMPOSITIONS, AND/OR METHODS FOR DE-SULPHURIZING ACID GASES

CROSS-REFERENCES TO RELATED APPLICATIONS

This application claims priority to, and incorporates by reference herein in its entirety, U.S. Provisional Patent Application 61/953,051, filed 14 Mar. 2014.

BRIEF DESCRIPTION OF THE DRAWINGS

FIG. 7 is a table listing sulfide control through ½% VTX as a function of ORP;
FIG. 8 is a table listing results of re-activation with a range of oxidants

DESCRIPTION

Figure 1:
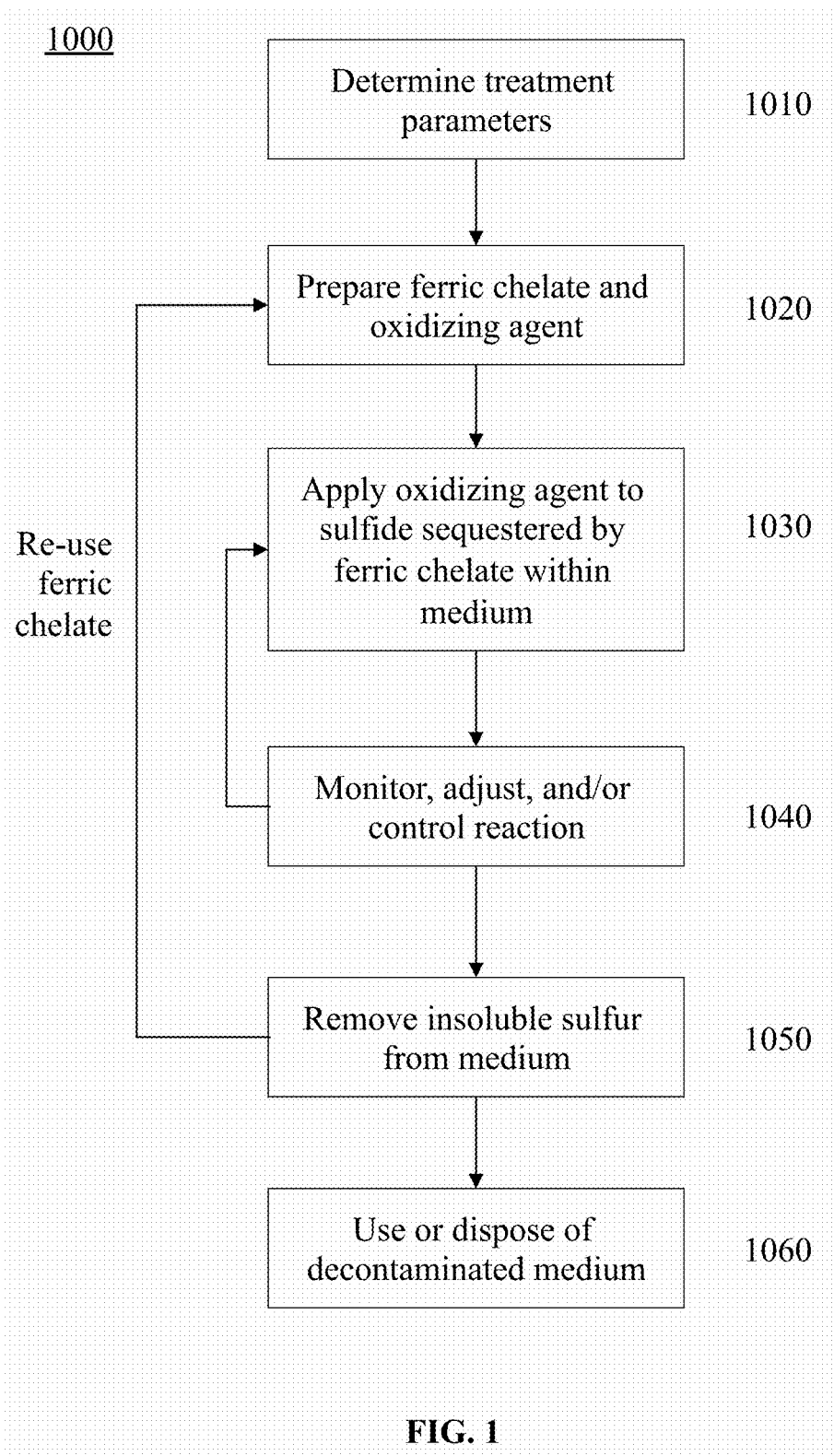
FIG. 1 is a flowchart of an exemplary embodiment of a method.

Certain exemplary embodiments can provide a batch or continuous process for removing hydrogen sulfide from aerobic or anaerobic gas, vapor, and/or atmospheric sources (herein collectively gases and/or gas matrix), whereby the gases can be bubbled up through a column of an aqueous solution of alanine, N,N-bis(carboxymethyl)-, iron metal to remove hydrogen sulfide from the gas. The alanine, N,N-bis(carboxymethyl)-, iron metal can react with sulfide and hold it with a weak bond that subsequently can be oxidized with low concentrations of a selected strong oxidant, such as persulfate, ozone, sodium chlorite, and/or various peroxides, etc. Insoluble elemental sulfur can be formed, with close control of pH and/or Oxidation Reduction Potential (ORP), and then can be filtered using commonly available methods. The alanine, N,N-bis(carboxymethyl)-, iron can be ready for the capture of additional hydrogen sulfide once an oxidant reacts with the sequestered sulfide.

Certain exemplary embodiments can provide a process for treating hydrogen sulfide within a gas, vapor, and/or atmosphere (gaseous matrix) that comprises introducing the gas through a diffuser to achieve small gas bubble diameter into a packed column filled with a solution of alanine, N,N-bis (carboxymethyl)-, iron (Ferric MGDA), wherein the system can be either a batch treatment system or a continuous flow system.

For efficient treatment, the column receiving the gaseous matrix can be held within a pH range of approximately 6.8 to approximately 7.8, such as approximately 7.5 to approximately 7.8, and/or the oxidation-reduction potential (ORP) can be held within a range of approximately −131 mV to approximately −425 mV, such as approximately −150 mV to approximately −325 mV.

Control of pH can be accomplished using common acids and/or bases. The pH also can be uniquely adjusted using small quantities of oxidants such as sodium percarbonate, calcium peroxide, magnesium peroxide, hydrogen peroxide, sodium persulfate, and/or sodium chlorite, etc., which can accomplish pH adjustment and oxidation simultaneously. Exposure of oxidants to Ferric MGDA that has sequestered sulfide can convert the sulfide to elemental sulfur while re-triggering the Ferric MGDA to react with additional sulfide.

Continuous or semi-continuous addition of one or more of the selected oxidants to maintain the ORP within a desired range can assure maximum availability of Ferric MGDA for sequestration of sulfide and/or maximum efficiency of conversion of sulfide to elemental sulfur within the range of pH from approximately 6.8 to approximately 7.8.

Batch treatment of a gaseous matrix containing hydrogen sulfide can be accomplished by diffusing the gas through a column of Ferric MGDA liquid at a rate of contact approximating approximately one second to approximately five seconds using a fine bubble diffuser to diffuse gases through the Ferric MGDA liquid for maximum exposure of hydrogen sulfide to Ferric MGDA liquid. A packed column design might provide better contact than an open channel design.

The concentration of Ferric MGDA used within columns for removing hydrogen sulfide from a gaseous matrix can range from approximately 0.01 M to approximately 2.3 M.

Re-triggering Ferric MGDA with sequestered sulfide can be continuously accomplished by re-circulating the column liquids containing Ferric MGDA and sequestered sulfide through a second vessel to receive dosages of oxidant at a rate to maintain the ORP within a desired range and pH adjustment chemistry to maintain the appropriate pH. The operating conditions can be chosen to maintain the oxidant dosage at a ratio approximating 1:1 moles of oxidant to sequestered sulfide to maximize chemical usage efficiency. Filtration of elemental sulfur can be accomplished continuously or semi-continuously.

For batch treatment, the gaseous matrix flow can be shut off while the re-triggering of Ferric MGDA occurred and/or elemental sulfur removed by filtration of the oxidized Ferric MGDA reagent. The gaseous matrix flow can be turned back on after the re-triggering event and/or proper adjustments for ORP and/or pH have been accomplished.

Introduction

Sulfonated organic compounds and hydrogen sulfide ($H_2S$) are a major problem for odor producers around the world. A great number of sulfur-related organic compounds, along with hydrogen sulfide, are primarily produced when organic matter is degraded by microorganisms under anaerobic conditions.

Odor-producing substances found in domestic and industrial wastewater and sludge are small, relatively volatile molecules having molecular weights between 30 and 150 g/mole. Most of these substances result from anaerobic decomposition of organic matter containing sulfur and nitrogen. Inorganic gases produced from domestic and industrial wastewater decomposition commonly include hydrogen sulfide, ammonia, carbon dioxide, and methane. Of these specifically named gases, only hydrogen sulfide and ammonia are malodorous. Often, odor-producing substances include organic vapors such as indoles, skatoles, mercaptans and nitrogen-bearing organics.

Hydrogen sulfide is the most commonly known and prevalent odorous gas associated with domestic wastewater collection and treatment systems. It has a characteristic rotten egg odor, is extremely toxic, and is corrosive to metals such as iron, zinc, copper, lead and cadmium. Hydrogen sulfide is also a precursor to sulfuric acid formation, which corrodes lead-based paint, concrete, metals and other materials. Hydrogen sulfide poses a major threat to infrastructure world-wide for its highly corrosive nature.

The conditions leading to $H_2S$ formation generally favor production of other malodorous organic compounds. Thus, solving $H_2S$ odor problems can often solve other odor problems as well. Many of the odors detected in wastewater collection and treatment systems result from the presence of sulfur-bearing compounds, such as allyl mercaptan, amyl mercaptan, benzyl mercaptan, crotyl mercaptan, and/or dimethyl sulfide.

Sources of Hydrogen Sulfide in the Energy Industry

Natural gas consumption has expanded greatly due to technological advances in hydraulic fracturing, an expansion in the scope of end uses, and abundant global reserves. Global consumption of the fuel has risen four-fold over the past 40 years, increasing from 23 trillion cubic feet (TCF) in 1965 to 113 TCF in 2011.

A great deal of variety exists among grades of natural gas. One such grade of natural gas is referred to as sour gas. Sour gas refers to natural gas that contains significant amounts of low pH, acidic gases such as hydrogen sulfide (H2S) and carbon dioxide (CO2).

Natural gas that is considered sour contains greater than approximately 5.7 milligrams of H2S per cubic meter (ppm), which is roughly equivalent to 4 parts per million by volume under standard temperature and pressure. In contrast, another such grade of natural gas is referred to as sweet gas. Sweet gas is preferable to sour gas because it does not contain the degree of contaminants found in sour gas. According to the International Energy Agency, excluding North America, sour gas constitutes roughly 43% of the world's total natural gas reserves, with sweet gas comprising the remainder.

There are a variety of reasons why sour gas is problematic for the natural gas industry. These include human health and safety concerns, corrosion of drilling and extraction equipment, and corrosion of gas pipelines used for transportation. According the Occupational Safety and Health Administration (OSHA) hydrogen sulfide has been found to be noticeably odorous at 0.01-1.5 ppm, and can cause nausea and dizziness between 2-20 ppm. At 100 ppm, H2S causes coughing, eye irritation and olfactory fatigue (loss of smell). At 500 ppm, death may occur after 30-60 minutes of exposure and at 1000-2000 ppm death can occur nearly instantly. For these reasons, OSHA has set a general industry ceiling limit of 20 ppm. Between 1993 and 1999, there were fifty-two deaths due to hydrogen sulfide in the United States. Common industries affected by hydrogen sulfide caused deaths included waste management, petroleum and natural gas.

Corrosion of equipment associated with extraction and transportation is also a significant issue that certainly results in enormous costs to industry. While a comprehensive study on the aggregate costs of hydrogen sulfide induced corrosion across the natural gas industry in the United States was not identified, the National Association of Corrosion Engineers (NACE) has estimated total corrosion costs in gas distribution and oil and gas exploration and production to be roughly $6.5 billion per year. Further, several studies have identified hydrogen sulfide gas as a major contributor to corrosion in the oil and gas industry where it is referred to as sulfide stress cracking (SSC) as well as hydrogen sulfide cracking, sulfide corrosion cracking, or sulfide stress corrosion cracking Regarding natural gas pipelines, SSC can occur both internally due to hydrogen sulfide presence within the pipeline gas and externally where hydrogen sulfide is present in the soil and water around the pipe. Internal SSC has been found to be far more common than external, which is rare. In general, hydrogen sulfide corrosion takes place through two key mechanisms, 1) materials are attacked by acid created when hydrogen sulfide comes into contact with moisture and 2) direct reaction with metals including copper, iron and silver. When considering the abundance of sour gas reserves, it becomes apparent that a significant need exists for technologies that can substantially eliminate hydrogen sulfide in a cost effective and environmentally responsible manner.

Physical and Chemical Properties of Hydrogen Sulfide

Hydrogen sulfide is a colorless gas that has a foul odor (rotten egg smell) and is slightly heavier than air. Human exposure to small amounts of hydrogen sulfide in air can cause headaches, nausea, and eye irritation.

Higher concentrations can cause respiratory system paralysis, resulting in fainting and possible death.

$H_2S$ presence in wastewater is due not so much to breakdown of organic matter as to the bacterial reduction of sulfate. By this it is meant that certain bacteria are able to split oxygen from the sulfate ion, $SO_4^=$, a common constituent of natural waters, and use it to oxidize organic matter. The sulfur is then left in the form of the sulfide ion, $S^=$, which immediately changes by reaction with water to a mixture of $H_2S$, $HS^-$ (read HS ion or hydrosulfide) and $S^=$. It is generally accepted that the amount of each species present is completely dependent on the pH of the water.

$H_2S$ is a gas slightly heavier than air. It condenses to a liquid only at the low temperature of $-62°$ C. It is fairly soluble in water. At 20° C., it can dissolve in pure water to the extent of 3850 milligrams per liter (mg/l), or 2.7 liters of $H_2S$ gas per liter of water. The solubility decreases about 2.5% for each degree increase of temperature. The stated solubility is the amount that will dissolve when the pure gas is brought into contact with pure water. It is generally accepted that, from $H_2S$ diluted with air, $H_2S$ will dissolve only in proportion to its concentration in the gas mixture. Thus, for example, air in which the concentration of $H_2S$ is 0.1% (1000 parts per million, ppm) by volume of $H_2S$ will, if brought to equilibrium with pure water at 20° C., produce a solution containing 3.85 mg/l. Stated differently, water containing 3.85 mg/l of $H_2S$ can produce a concentration of 0.1%, or 1000 ppm, in air brought into contact with it. One mg/l in solution can produce a concentration of about 260 ppm by volume in the air if the temperature is 20° C., or 330 ppm by volume if the temperature is 30° C.

TABLE 1

Proportions of $H_2S$ and HS- in Dissolved Sulfide

| pH | Proportion of un-ionized $H_2S$ | Proportion of HS- |
|---|---|---|
| 5.0 | 0.99 | 0.01 |
| 6.0 | 0.91 | 0.09 |

TABLE 1-continued

Proportions of $H_2S$ and $HS-$ in Dissolved Sulfide

| pH | Proportion of un-ionized $H_2S$ | Proportion of HS- |
|---|---|---|
| 6.2 | 0.86 | 0.14 |
| 6.4 | 0.80 | 0.20 |
| 6.6 | 0.72 | 0.28 |
| 6.8 | 0.61 | 0.39 |
| 7.0 | 0.50 | 0.50 |
| 7.2 | 0.39 | 0.61 |
| 7.4 | 0.28 | 0.72 |
| 7.6 | 0.20 | 0.80 |
| 7.8 | 0.14 | 0.86 |
| 8.0 | 0.09 | 0.91 |
| 8.2 | 0.059 | 0.941 |
| 8.4 | 0.039 | 0.961 |
| 8.6 | 0.025 | 0.975 |
| 8.8 | 0.016 | 0.986 |
| 9.0 | 0.010 | 0.99 |

When dissolved in water, hydrogen sulfide is partially ionized, so that it exists as a mixture of H2S and HS—. The proportions depend principally upon the pH of the solution. In typical natural water at a temperature of 20° C., and at pH 7.0, it is just 50% ionized; that is, half of it is present as HS— and half as un-ionized H2S. Table 6 shows the proportions ionized at other pH levels. Temperature and mineral content of the water affect the degree of ionization, but only by a small amount. The sulfide ion, S═, also exists in water, but not in appreciable amounts except in solutions in which the pH is above 12. The solubility data given in the previous paragraph applies only to the equilibrium between the gas and the slightly acidic (low-pH) solution produced when it dissolves in pure water or between the gas and the unionized H2S in waters where the pH is not low.

Regulatory

Recent rulings by the US EPA placed hydrogen sulfide on the Toxic Substances Control Act (TSCA) list. Further, the Occupational Safety and Health Administration (OSHA) is considering a further reduction for the exposure limits for hydrogen sulfide gas from 10 ppm to 1 ppm for workers. Hydrogen sulfide gas is a major problem in a number of industrial and municipal treatment facilities across the USA and the world. It is a major problem at wastewater treatment operations, landfill sites, and, notably, within the petroleum industry from drilling to production, pipeline transmission, storage and, finally, in refineries.

Use of the VTX Process for Treatment of Sulfonated Organic Malodors and Hydrogen Sulfide from Atmospheric and Natural Gas The VTX Process can be successfully used for treating hydrogen sulfide and sulfonated organic compounds within aerobic gas streams and/or in anaerobic sour gas streams, and/or odors due to such contaminants. The VTX process can be successfully used for treating hydrogen sulfide and sulfonated organic compounds nearly anywhere that odorous gases are captured, concentrated, and/or emitted, such as within and/or output by tanks and/or scrubbers at industrial and/or municipal wastewater treatment plants and/or exhaust gases from anaerobic digesters. Odors from landfills can be treated as well as from industrial processes like rendering operations where atmospheric gas might contain hydrogen sulfide and/or sulfonated organic compounds coming off of processing carcasses.

The VTX Process is based upon the finding that a metalo-organic catalyst, ferric methylglycenediacetate (Fe-MGDA or Alanine, N,N-bis(carboxymethyl)-, iron metal), along with selected oxidants, can be employed to degrade sour gas contaminants at normal pH levels at much more efficient rates than the oxidants alone. With this technique, sour gas hydrogen sulfide and/or sulfonated organic compounds having at least one oxidizable aliphatic or aromatic functional group can be completely or very nearly completely oxidized on contact. A broad list of treatable sulfonated organic compounds includes the following:

Methanethiol—CH3SH [m-mercaptan];
Ethanethiol—C2H5SH [e-mercaptan];
1-Propanethiol—C3H7SH [n-P mercaptan];
2-Propanethiol—CH3CH(SH)CH3 [2C3 mercaptan];
Butanethiol—C4H9SH [n-butyl mercaptan];
tert-Butyl mercaptan—C(CH3)3SH [t-butyl mercaptan];
Pentanethiols—C5H11SH [pentyl mercaptan];
Thiophenol—C6H5SH;
Dimercaptosuccinic acid;
Thioacetic acid;
Coenzyme A;
Glutathione;
Cysteine;
2-Mercaptoethanol;
Dithiothreitol/dithioerythritol (an epimeric pair);
2-Mercaptoindole;
Grapefruit mercaptan;
Furan-2-ylmethanethiol; and/or
3-Mercaptopropane-1,2-diol;
etc.

The VTX Process can have a role within selected sour gas industrial processes where hydroxyl and free radicals are important to the production process.

The VTX catalyst (Fe-MGDA) is generally safe (i.e., does not contaminate the natural gas stream). The VTX catalyst is predominantly organic in composition but also contains metal ions that act as the chief catalysis points in a reaction with selected oxidants to produce hydroxyl radicals and/or free radicals. Importantly, the VTX catalyst allows the reaction to proceed at neutral pH. The non-metallic portion of the VTX catalyst is typically, but need not be, consumed in the reaction process. The organic components of the VTX catalyst are also biodegradable and approved by the EPA for use in the environment under TSCA.

The VTX Process can be employed in a variety of ways and can be easily adaptable to existing treatment systems, including in situ remediation of contaminated gas streams (e.g., sour gas streams, wastewater treatment gas streams, etc.). The contact time for the oxidation portion of the VTX Process to occur can be short, usually under 3 hours for recalcitrant chemicals. The VTX Process can be notably short (<5 minutes) and highly selective for treatment of simple problematic chemicals such as sulfides, which can make the VTX Process highly desirable for treatment within sour gas wellheads, separators, and/or pump stations where treatment convenience, corrosion, and/or odors can be concerns.

The VTX Process can replace existing oxidative treatment systems of nearly any size. Significantly, implementing the VTX Process can require no materials of special construction and power requirements can be relatively minimal.

The VTX Process can take place under aerobic, anaerobic, and/or substantially anaerobic conditions. Although oxidants can be used to retrigger the VTX catalyst once saturated, upon doing so, the ORP can remain relatively low, such as well below what would be considered an oxidative environment. Oxidant need not be added to generate positive oxygen levels.

Certain exemplary embodiments of the VTX Process can result in the generation of free radicals and/or hydroxyl radicals. The combination of various process steps can result in a system that can effectively treat existing total sulfide, hydrogen sulfide, and/or sulphonated organic compounds, and/or prevent the formation of additional sulfides and/or sulphonated organic compounds under extended anaerobic conditions that are conducive to such formation.

It is not necessarily currently known with certainty exactly how certain embodiments might cause the reduction in concentration of sulfide-related contaminants. Nevertheless, several potential theories to describe the mechanism of the reaction are recognized by the inventor. For example, it is speculated that the VTX catalyst serves to "grab" the sulfur within sulfonated organics and hydrogen sulfide under anaerobic (and even aerobic) conditions until an added oxidant (either external to the column through recirculation or internal using small amounts of selected oxidant) converts the sulfur to elemental sulfur and/or oxidizes the vulnerable sulfonated organic compound to a less offending form (incomplete oxidation of the molecule) and/or to carbon dioxide and water if enough oxidant is added.

Moreover, it is not currently known with certainty exactly how certain embodiments cause the reduction in concentration of any contaminant, and particularly, the precise reaction mechanism is not known with certainty. Nevertheless, several potential theories to describe the mechanism of the reaction are recognized and described herein.

According to certain theories, hydroxyl radicals, free radicals, or both react with and degrade at least the target contaminant. As a foundation for these theories, it is recognized that numerous contaminated media, natural gas streams, can be treated by the application of oxidants. Table 2 lists several oxidants and their oxidation potential.

TABLE 2

Oxidants and Oxidation Potential

| Oxidant | Oxidation Potential, V |
| --- | --- |
| Fluorine | 3.0 |
| Hydroxyl radical | 2.8 |
| Ozone | 2.1 |
| Hydrogen peroxide | 1.8 |
| Potassium permanganate | 1.7 |
| Chlorine dioxide | 1.5 |
| Chlorine | 1.4 |

As shown in Table 2, hydrogen peroxide is a relatively powerful oxidant. Also shown in Table 2 is the much more powerful hydroxyl radical, a type of free radical, which is second in the list only to fluorine in its oxidation potential. During certain oxidation processes, such as those involving hydroxyl and/or other free radicals, organic contaminants can be completely, or nearly completely mineralized to carbon dioxide, oxygen, water, and a small amount of mineral acids or salts.

Hydroxyl radicals can be generated during processes involving the catalyzed activation of hydrogen peroxide using such metals as iron, copper, manganese, and/or other transition metal compounds. One group of such processes is Fenton-type chemical reaction systems, which employ ferrous salts and hydrogen peroxide in acidified (pH approximately 2 to approximately 3) suspensions.

In the classic Fenton reaction (Equation 1, below), ferrous ion rapidly reduces hydrogen peroxide to primarily hydroxyl radicals, which can react with and degrade a target contaminant. The reaction involves hydrogen peroxide and a ferrous iron catalyst. The peroxide is broken down into a hydroxide ion and a hydroxyl free radical. The hydroxyl free radical is the primary oxidizing species and can be used to oxidize and break apart organic molecules.

$$H_2O_2 + Fe^{2+} \rightarrow Fe^{3+} + HO^- + HO^*$$ (Equation 1)

In the classic Fenton reaction, ferrous ion is required in stoichiometric amounts. Ferrous ion also can be oxidized by the hydroxyl radicals, and therefore can compete with the target compounds unless its concentration is kept low by gradual addition in dilute form.

Ferric ion also can produce hydroxyl radicals from peroxide, albeit at a slower rate than ferrous ion. The use of ferric ion, however, typically requires acidic conditions to keep the iron soluble; the reaction has an optimum pH of approximately 3. In certain media, acidification to an optimum pH of approximately 3 can be challenging because the media can have a high buffering capacity. Moreover, media acidification itself can be viewed in at least some circumstances as a polluting practice, potentially requiring the media neutralized before use and/or delivery.

Certain exemplary embodiments are based, at least in part, on the surprising discovery that certain active ferric chelates and selected oxidizing agents unpredictably demonstrate significant activity at oxidizing contaminants associated with a medium above and beyond the activity which would be expected in the presence of the selected oxidizing agent alone.

Certain exemplary embodiments comprise a method for reducing a concentration of a contaminant associated with a medium, comprising treating the medium with an active ferric chelate and an oxidizing agent in amounts effective to oxidize at least a portion of the contaminant.

The oxidizing agent can be a peroxide, such as hydrogen peroxide, calcium peroxide, and/or magnesium peroxide, etc.; a persulphate, such as sodium persulphate, potassium persulphate, and/or ammonium persulphate, etc; ozone; a permanganate, such as sodium permanganate, potassium permanganate, etc; chlorine dioxide; and/or a halogen, such as chlorine, bromine, iodine, and/or fluorine, etc.

The medium can be any fluid, such as air, vapor, exhaust, and/or vent gas, etc. Moreover, the fluid can occupy a space defined at least in part by a structure, such as for example, a tunnel, mine, well, ditch, canyon, cavern, cave, hole, corner, niche, bunker, building, compartment, room, clean room, enclosure, container, tank, pipe, equipment, ship, airplane, vehicle, automobile, and/or train, etc.

Numerous embodiments are possible. The following exemplary embodiments are intended to merely illustrate, and not limit, the breadth and depth of embodiments that can fall within the scope of any future claims.

The problem of rapidly removing hydrogen sulfide and/or sulfonated organic malodors from gas streams, including natural gas streams, can be uniquely solved by utilizing a series of controls and chemical conditions associated with the VTX Process. The controls and chemical conditions can be summarized as follows:

Treatment of hydrogen sulfide occurred at a surprisingly rapid rate (estimated to be less than one second of contact time) when VTX was prepared by adding ~one iron molecule for every 5 available methylglycinediacetate (MGDA) chelate ligands. The VTX concentrate formulated used ~1.68 moles of MGDA (3 active ligands per molecule) per 0.597 moles of ferric iron. It was apparent that advantages may be gained by leaving significant numbers, e.g., approximately 80% of the available bonds of MGDA chelant ligands open.

Complete treatment of hydrogen sulfide occurred using distilled water dilutions of the mixture of 0.597 M iron to 1.68 M MGDA (VTX concentrate) of 20% VTX concentrate, 10% VTX concentrate, 1% VTX concentrate and 0.5% VTX concentrate. Complete treatment was defined as 200 ppm H2S entering the treatment vessel and 0 ppm hydrogen sulfide exiting the vessel (note that the vessel can be any container, including a reactor, tank, tower, pipe, tube, flask, beaker, etc.). Gases were tested for hydrogen sulfide using an L2 Odalog Logger from Detection Instruments, 18441 N. 25$^{th}$ Street, Phoenix, Ariz. with sensitivity to 1 ppm.

A unique feature of various dilutions of the VTX catalyst tested was that there was an apparent chemocline associated with pH at a depth of approximately 11 centimeters within all of the dilutions tested. At the approximately 11 centimeter depth, the pH of VTX changed dramatically downward by 2 full pH units in all tests conducted over several dilutions of the VTX catalyst.

Surprisingly, effective treatment of hydrogen sulfide gas was only complete within a window of pH from approximately pH 6.3 to approximately pH 9.0. Treatment efficiency outside of this window goes down significantly as the pH drifts further away from the effective approximately pH 6.3 to approximately pH 9.0 window (effective range). This surprising result might be critically important for successful treatment as the VTX catalyst is re-circulated through the treatment column.

Another unique discovery was noted around an effective range for successful hydrogen sulfide treatment using Oxidation Reduction Potential (ORP). Treatment effectiveness was highly efficient in removing hydrogen sulfide within an effective ORP range of approximately −150 mV to approximately −425 mV, which is considered a reducing range, not oxidative. Treatment efficiency deteriorated outside of this range on both ends, even as the ORP moved towards a much more oxidized state (more positive). It is surprising that treatment efficiency was most effective within a reduced ranged of ORP and equally surprising that a more oxidized state of ORP above approximately −150 mV resulted in further deterioration of treatment efficiency with increasingly positive ORP.

Control of the range of both pH and ORP can be equally critical. It is possible for the ORP to be outside of the effective range and pH to be inside of its effective range and the system will experience failure of treatment of hydrogen sulfide. Also, the opposite is true. It is possible that having the ORP outside of the effective range and pH inside of the range will result in failure of treatment effectiveness of hydrogen sulfide.

Re-activation of the VTX catalyst, once saturated, can be achieved by some oxidants, but, surprisingly, not all oxidants. This includes oxidants within the same general class. Hydrogen peroxide and sodium percarbonate can re-activate the catalyst but peracetic acid can't even though hydrogen peroxide is a major constituent of them all. Sodium hypochlorite did not re-activate the catalyst but sodium chlorite did re-activate the catalyst. Re-activation of the catalyst without using oxygen can be particularly valuable for safety reasons.

Although not intended to be bound by the theory, a potential mechanism for how this works is, so long as the required reaction conditions are met, the hydrogen sulfide reacts with and iron on one of the MGDA ligands and forms a weakly bonded hydrosulfide iron relationship. Then, when the re-activation occurs, the hydrosulfide converts to elemental sulfur as an electron is taken away from the sequestered sulfide.

Method 1000

FIG. 1 is a flowchart of an exemplary embodiment of a method 1000, which can begin at activity 1010 by determining the treatment parameters. Included in this determination can be activities such as sampling the medium to detect if a contaminant is present, analyzing the sample or the medium to identify the contaminant(s) and/or to determine what concentrations of the contaminant are present, determining an amount of the medium to treat, determining where to treat the medium (e.g., in situ, ex situ, or both), and/or determining temperatures, pressures, and/or flowrates of the medium, the ferric chelate (e.g., Fe-GLC and/or Fe-MGDA, etc.), and/or the oxidizing agent.

At activity 1020, effective amounts of the ferric chelate and/or oxidizing agent can be prepared.

One method of preparing ferric gluconate (Fe-GLC or Fe-GLU) is to directly mix with GLC a source of ferric ion, such as an aqueous solution of a ferric salt, such as ferric perchlorate, ferric nitrate, ferric citrate, ferric malate, ferric lactate, and/or ferric oxalate, etc. Another method is to mix a liquid ferric chloride solution with GLC. Ferric chloride can be purchased as a ~13% ferric solution with a pH of about 1.0 to about 1.5 from Univar, 825 Fisher Street, Martinsville, Va., in 55 gallon drum and tanker load quantities.

The chelating agent GLC, which is sometimes referred to as gluconate and/or as sodium gluconate, can be purchased from Jungbunzlauer AG, St. Alben-Vorstadt 90, CH-4002, Basel, Switzerland. It can be purchased as a powdered concentrate in 25 kg bags and 1000 kg bags. Sodium gluconate is the sodium salt of gluconic acid, which can be produced by fermentation of glucose. It can be white to tan in color, granular to fine in particle size, very soluble in water, non-corrosive, non-toxic, and/or readily biodegradable (98% after 2 days).

Formulation of one liter of the ferric chelate Fe-GLC (sometimes referred to herein as VTXG) can be made by adding 52.3 milliliters (~27 grams of GLC-Na3 depending on density) of sodium gluconate to approximately 800 milliliters of water. This solution can be then mixed continuously with a magnetic stir bar or other mechanical mixing technique. Liquid ferric chloride solution can be added to the solution while the pH of the mixture is monitored. The pH of gluconate/water mixture can be adjusted from 10 to 12 initially with sodium hydroxide. Ferric chloride then can be added until the pH of the solution comes down to a pH of about 7.0 or to a circumneutral pH (e.g., approximately pH 6 to approximately pH 8). Water can be added to achieve a final volume of 1000 millimeters. At this point the Fe-GLC can be ready for use. Larger volumes can be produced by scaling-up this formulation. In certain exemplary embodiments, liquid ferric chloride solution can be added to GLC as a concentrated water/liquid mixture at ~40% sodium gluconate/60% water with a final pH of the ferric gluconate solution being 7.0 or circumneutral pH after the ferric chloride titration.

One method of preparing Fe-MGDA is to directly mix with MGDA a source of ferric ion, such as an aqueous solution of a ferric salt, such as ferric perchlorate, ferric nitrate, ferric citrate, ferric malate, ferric lactate, and/or ferric oxalate, etc. Another method is to mix a liquid ferric chloride solution with MGDA.

The chelating agent MGDA, which is sometimes referred to as methylglycinediacetate and/or as trisodium methylglycinediacetate, can be purchased from BASF Corp, 3000 Continental Drive—North, Mount Olive, N.J. 07828-1234, under their product name, Trilon M. It can be purchased as a 39% concentrated liquid in 55 gallon drum and tanker load quantities. Trilon M has a density of 1.29-1.33 g/cm3, a pH of about 10.0 to about 12.0, and a molecular weight of MGDA-Na3: 271.

Formulation of one liter of the ferric chelate Fe-MGDA (sometimes referred to herein as VTX) can be made by adding 52.3 milliliters (~27 grams of MGDA-Na3 depending on density) of Trilon M liquid to approximately 800 milliliters of water. This solution can be then mixed continuously with a magnetic stir bar or other mechanical mixing technique. Liquid ferric chloride solution can be added to the solution while the pH of the mixture is monitored. The pH of Trilon M/water mixture can be from 10 to 12 initially. Ferric chloride can be added until the pH of the solution comes down to a pH of about 7.0. Water can be added to achieve a final volume of 1000 millimeters. At this point the Fe-MGDA can be ready for use. Larger volumes can be produced by scaling-up this formulation. In various alternative embodiments, liquid ferric chloride solution can be added to undiluted MGDA.

Other ferric chelates can be made in a similar manner as those described above.

The ferric chelate can be applied to a contaminated medium before, during, in combination with, and/or after an oxidizing agent in amounts and/or concentrations effective to degrade, and/or substantially reduce the concentration of, the target contaminant. The amounts of ferric chelate and oxidizing agent needed and/or utilized can depend upon, for example, the concentration of the contaminant(s) to be degraded, the available reaction time, temperature of the reactants (e.g., the ferric chelate, the oxidizing agent, and/or the contaminated medium), and/or the organic matter content of the medium.

In certain exemplary embodiments, the ferric chelate and the oxidizing agent can be mixed, and even conveyed, before being applied to the contaminated medium. In certain exemplary embodiments, the ferric chelate and the oxidizing agent can mix while in contact with the contaminated medium.

At activity 1030, the ferric chelate and the oxidizing agent can be applied to the contaminant, the medium, and/or the contaminated medium. The ferric chelate and/or the oxidizing agent can be applied as solid, liquid, vapor, aerosol, and/or foam.

For example, a ferric chelate and an oxidizing agent can contact the contaminated medium, potentially in the presence of water. As another example, the oxidizing agent can be applied to sulfide that has been sequestered by the ferric chelate within the medium.

In certain exemplary embodiments involving sour gas, chelate and oxidizing agent solutions can be employed, and these can simply be added to the sour gas at ambient temperature, so long as there is sufficient water present in the final solution to allow mixing of the ingredients. Also, more concentrated oxidizing agent and chelate solutions can be mixed into the sour gas. In certain exemplary embodiments, ultra-violet light and/or other forms of light, radiation, and/or energy, etc., can be utilized to speed degradation.

At activity 1040, the reaction between the ferric chelate, oxidizing agent, and the contaminant can be monitored, adjusted, and/or controlled. For example, included in this activity can be activities such as sampling the medium to detect if a contaminant is still present, analyzing the sample or the medium to identify what contaminant(s) remains and/or to determine what concentrations of the contaminant remain, and/or monitoring, adjusting, and/or controlling temperatures, pressures, and/or flowrates of the contaminated medium, the ferric chelate, the oxidizing agent, and/or the decontaminated medium.

To increase the temperature, pressure, and/or rate of the reaction, an accelerant can be added to, for example, the contaminated medium, the ferric chelate, the oxidizing agent, and/or the reacting mixture. Such an accelerant can be, for example, an organic compound and/or biological that can react rapidly with the ferric chelate and the oxidizing agent.

Heat generated by the reaction can be captured, transferred, and/or utilized. For example, the reaction can occur within a reactor vessel that is surrounded by cooling coils. The heat absorbed by a heat transfer fluid circulating in the coils can be used for any heating purpose, such as to dry the decontaminated medium, and/or to heat another process, fluid, and/or environment.

The reaction can be allowed to run its course, and/or can be halted, for example, before complete oxidation of the contaminant has occurred. Adding an additional oxidizable substance to the medium, thereby diverting some of the oxidants to the additional substance and/or consuming the oxidants' oxidizing capability can cause such a halting. Moreover, such a halting of the reaction, or at least a decrease in the reaction rate, can also occur by reducing and/or limiting the flow of the reactants (e.g., the ferric chelate, the oxidizing agent, the contaminated medium, and/or the additional oxidizable substance), changing the concentration of any of the reactants, lowering the temperature of any of the reactants, and/or by withdrawing heat generated by the reaction.

After the reaction, the medium can be treated to reduce a concentration of iron associated with the medium. The medium can also be re-treated to further reduce a concentration of the contaminant.

At activity 1050, after the reaction, insoluble sulfur can be removed from the gas, thereby resulting in a "decontaminated" medium (i.e., a medium having a lower concentration of the contaminant) and/or a "sweetened" gas, such as sweet natural gas. The ferric chelate, having released its sulfur, can be recycled and re-used to sequester more sulfide.

At activity 1060, the decontaminated medium can be disposed of and/or used. Prior to disposal and/or use, however, the medium can be sampled to detect if any contaminant is still present, analyzed to identify what contaminant(s) remain, and/or to determine what concentrations of the contaminant are present. Further, a determination can be made regarding how much reduction has occurred in the target contaminant(s).

Also, the decontaminated medium can be conveyed to a disposal and/or use site, and/or can be discharged at the disposal and/or use site. A disposal site can be, for example, the atmosphere, a waterway, an injection well, and/or a landfill. In the case of a decontaminated and/or sweetened gas, the gas can be conveyed and/or distributed, such as via pipeline, truck, and/or ship, to a point of use, such as a feedstock to a chemical process, an industrial boiler, land-based gas turbine, water heater, backyard grill, etc.

Certain exemplary embodiments can be used for treating contaminated sour gas. In certain exemplary embodiments, each sour gas stream can be exposed to and/or saturated with both the oxidizing agent (e.g., hydrogen peroxide, sodium percarbonate, etc.) and ferric chelate, such as Fe-MGDA, Fe-GLC, etc. Dose rates can vary with contaminant and demand for the oxidants generated by the reactants. As used herein, "hydrogen peroxide" refers to a fluid solution of hydrogen peroxide and solvent, with the concentration of hydrogen peroxide ranging from approximately 0.01% to about 100%. An exemplary embodiment of a solvent for hydrogen peroxide can be water. Thus, as is apparent in the experimental results presented later in this application, "hydrogen peroxide" can refer to an aqueous hydrogen peroxide solution. Dose rates can vary with contaminant and demand for the oxidants generated by the reactants.

Manufacturing Technique for VTX Catalyst

For the VTX Process, the chelating agent MGDA, which is sometimes referred to as methylglycinediacetate and/or as trisodium methylglycinediacetate, can be purchased from BASF Corp, 3000 Continental Drive—North, Mount Olive, N.J. 07828-1234, under their product name, Trilon M. It can be purchased as an approximately 39% concentrated liquid in 55 gallon drum and tanker load quantities. Trilon M has a density of approximately 1.29-approximately 1.33 g/cm3, a pH of approximately 10.0 to approximately 12.0 with a typical pH of approximately 11.5, and a molecular weight of 271 (as MGDA-Na3). The MGDA molecule within trisodium MGDA represents a molecular weight of 202 with three active sites per molecule open for chelation with multivalent metal ions such as iron, copper, zinc, etc.

One method of preparing Fe-MGDA is to directly mix with MGDA a source of ferric ion, such as an aqueous solution of a ferric salt, such as ferric perchlorate, ferric nitrate, ferric citrate, ferric malate, ferric lactate, and/or ferric oxalate, etc. Another method is to mix a liquid ferric chloride solution with MGDA. Ferric chloride can be purchased as an approximately 13% ferric solution which approximates 187 mg/ml ferric at a density approximating 1.44 gm/cm3 with a pH of approximately 1.0 to approximately 1.5 from Brenntag, 1405 Highway 136 West, Henderson, Ky. 42420 in 55 gallon drum and tanker load quantities.

Manufacturing of VTX concentrate can be accomplished, for the purposes of this particular embodiment, by adding approximately 250 milliliters of ferric chloride at approximately 13% ferric to approximately 750 milliliters of trisodium MGDA. The resulting pH usually is circum-neutral at this point. If it is not circum-neutral then the pH can be adjusted to approximately 7.0 with hydrochloric acid and/or sodium hydroxide as required. Dilutions of the VTX concentrate typically are made in a variety of dilutions with distilled water. The dilutions most often used (as a volume % of concentrated VTX) are: approximately 20%, approximately 10%, approximately 5%, approximately 1% and approximately ½%).

Calculation of Active Chelation Sites Available to Each Ferric Molecule

The resulting VTX concentrate has approximately 46.75 grams/liter of iron in the approximately 250 milliliters of ferric chloride added and approximately 750 milliliters of trisodium MGDA weighs approximately 975 grams resulting in approximately 380.25 grams of actual trisodium MGDA at the approximately 39% by weight in the liquid Na3-MGDA concentrate. Discounting the 3 sodium molecules from the molecular weight of 271 to 202 for the MGDA portion means that approximately 283.4 grams exist per 750 milliliters of actual MGDA used to make VTX concentrate for the studies involved. Variations for both chemicals may differ slightly as noted by manufacturers. The resulting molarity of ferric is then approximately 0.837 M/liter and approximately 1.40 M/liter for MGDA. The ratio of ferric to MGDA on a molar basis is then approximately 0.597 M Ferric/1.0 M MGDA or, since there are 3 active ligand sites per molecule MGDA, it follows that approximately 5 chelation ligand sites exist for every single ferric molecule. It then follows, logically, that ferric ions are in relative short supply as they relate to active chelation ligand sites to host them. This fact might be important for the considerable efficiencies noted within lab and field trials. Variation from this particular ratio might prove to add further to efficiency.

Experiment 1—Hydrogen Sulfide Break-through Analysis With Study of Various Re-activation Agents Objective:

To determine the mass of sulfide necessary to achieve break-through of sulfide through a column of VTX using approximately 100 ppm hydrogen sulfide test gas with a nitrogen carrier and, once reaching break-through, to regenerate the approximately 1% VTX with atmospheric oxygen to determine if it would work just as efficiently for treatment a second time through.

Figure 2:
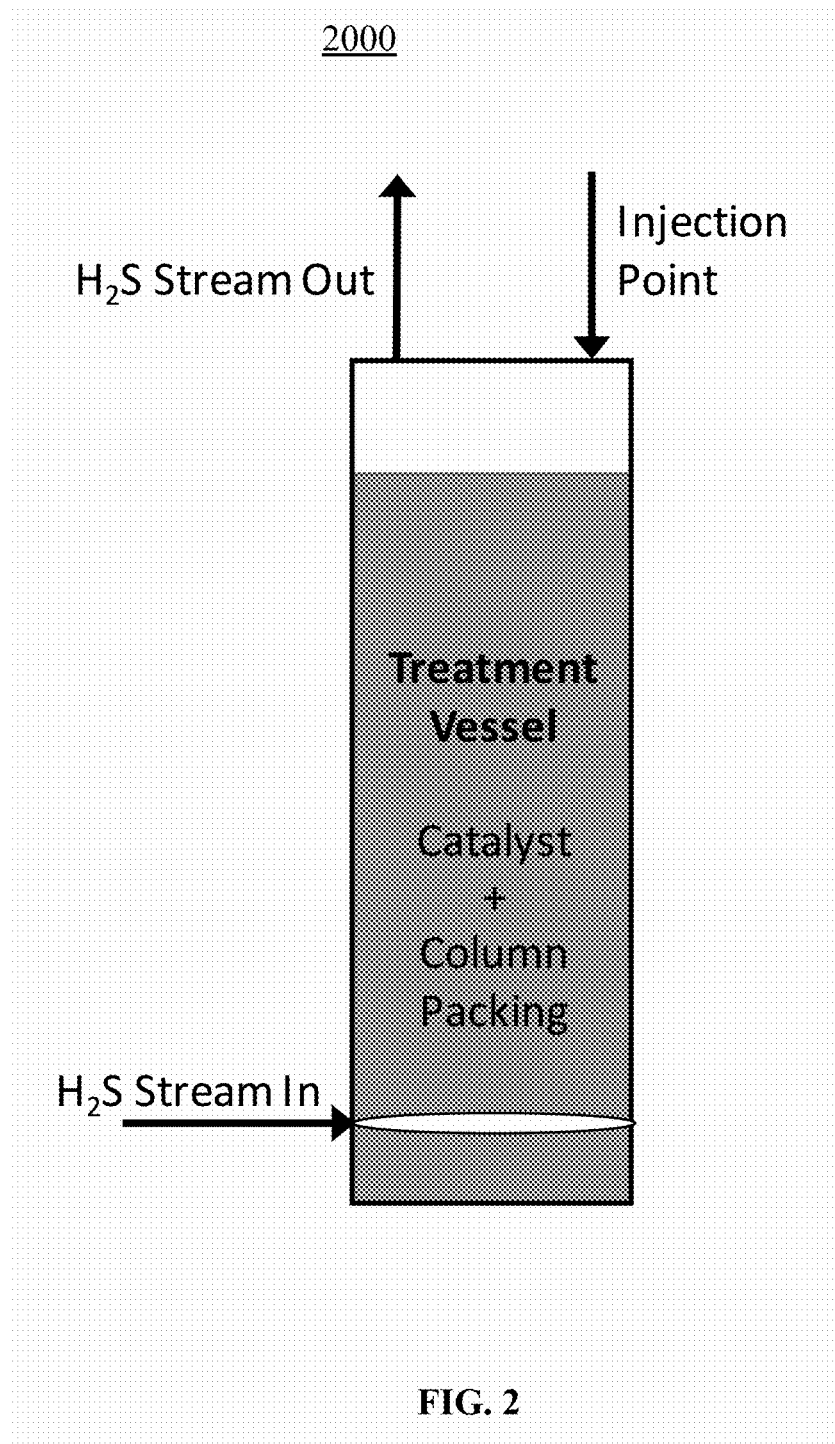
FIG. 2 is a block diagram of a lab scale treatment vessel.

Materials and Methods:

Trial 1 used approximately one liter of approximately 1% VTX catalyst at an initial pH of approximately 7.5. FIG. 2 is a block diagram of a lab scale treatment vessel, which illustrates a fabricated column into which the liquid was poured. Depth of the liquid within the column was approximately 12.9 centimeters. A fine bubble diffuser was placed at the bottom of the column and covered with approximately 0.5" diameter plastic column packing to encourage enhanced contact time. The fine bubble diffuser was fed by a tank of approximately 100 ppm hydrogen sulfide test gas within a nitrogen carrier gas. Gas flow rate was governed by a flow meter capable of 25 cubic feet per hour of flow. An Odalog from Detection Instruments capable of measuring hydrogen sulfide gas concentration to 1000 ppm was used to monitor and confirm influent and effluent H2S concentration. The Odalog was hung just above a gas exit port at the top of the column so as to monitor 100% of outgoing flow.

Trial 1 flow rate was set at approximately 10 cubic feet per hour (approximately 5,000 cubic centimeters per minute) and the trial ran for approximately 30 minutes. Zero ppm sulfide was noted for the durations so the dilution of catalyst was reworked to a approximately 0.5% solution of VTX at pH approximately 7.5 and the study was redone at the same flow rate for Trial 2.

Upon conclusion of Trial 2 with some break-through of sulfide, a small aquarium style aeration devise was connected to the diffuser and the mixture within the column was allow to aerate overnite (approximately 12 hours). Trial 3 was initiated using the same conditions as used for Trial 2 to test the ability of oxygen to regenerate the VTX catalyst (Trial 3).

Trial 4 repeated all conditions for Trial 3 after the column experienced break-through of sulfide except that an immediate addition of approximately 1 mM calcium nitrate was administered.

Trial 5 was begun with conditions of Trial 2 conducted to break-through with approximately 60 mg of H2O2 administered to the failing column.

Trial 6 was begun with conditions of Trial 2 conducted to break-through with approximately 0.66 grams of sodium persulfate administered to the failing column.

Results and Discussion:

Trial 1 was, basically, an experimental run to try and calibrate the % of catalyst used so as to encourage failure within a reasonably short period of time due to the shear number of experiments necessary to accomplish the goals set for this effort. Extending the life of the catalyst would serve no significant purpose as relates to the end goals set for the experimentation. In Trial 1 it was apparent that failure of the column was going to result in a lot of time lost to the significant efficiency of the VTX catalyst. Therefore, after approximately 30 minutes of run time with no indication of hydrogen sulfide break-through, it was decided to half the concentration and go again.

With the approximately same conditions of flow, pH, volume of catalyst at half the concentration of Trial 1 (approximately ½% instead of the approximately 1% for Trial 1), Trial 2 began as with Trial 1 at approximately zero ppm hydrogen sulfide escaping with approximately 100 ppm going into approximately 1 liter of catalyst through the column of approximately 12.7 centimeters depth of catalyst.

Figure 3:
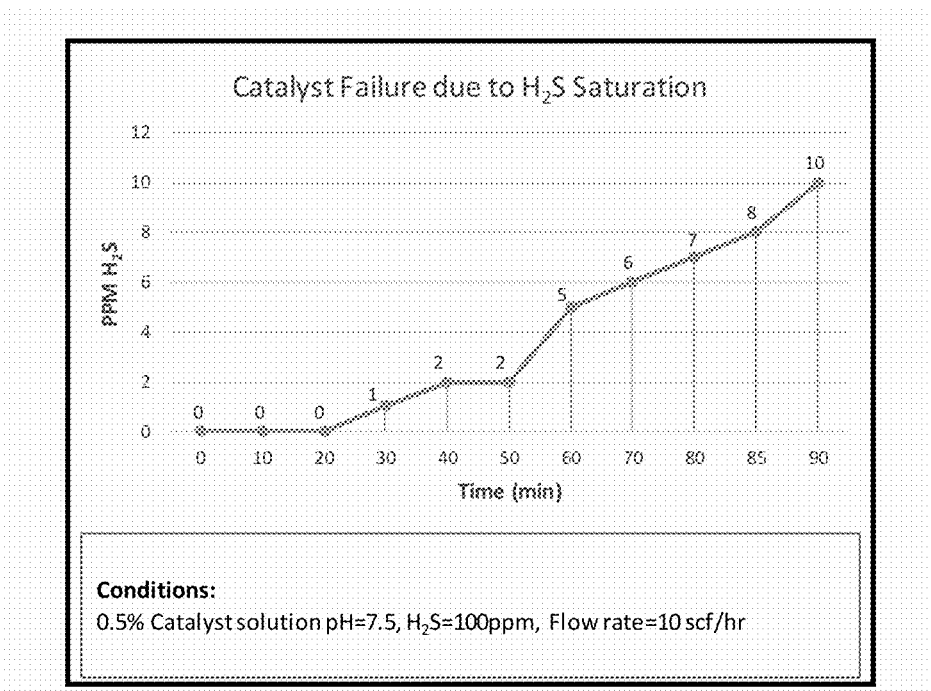
FIG. 3 is a chart showing time to failure prior to re-activation for Trial 2.

FIG. 3 is a chart showing time to failure prior to re-activation for Trial 2. No hydrogen sulfide escaped the column until approximately 30 minutes had expired when approximately 1 part per million escaped. The hydrogen sulfide continued a slow climb of break-through for an additional approximately 60 minutes with approximately 10 ppm of hydrogen sulfide escaping after approximately 90 minutes of flow.

Figure 4:
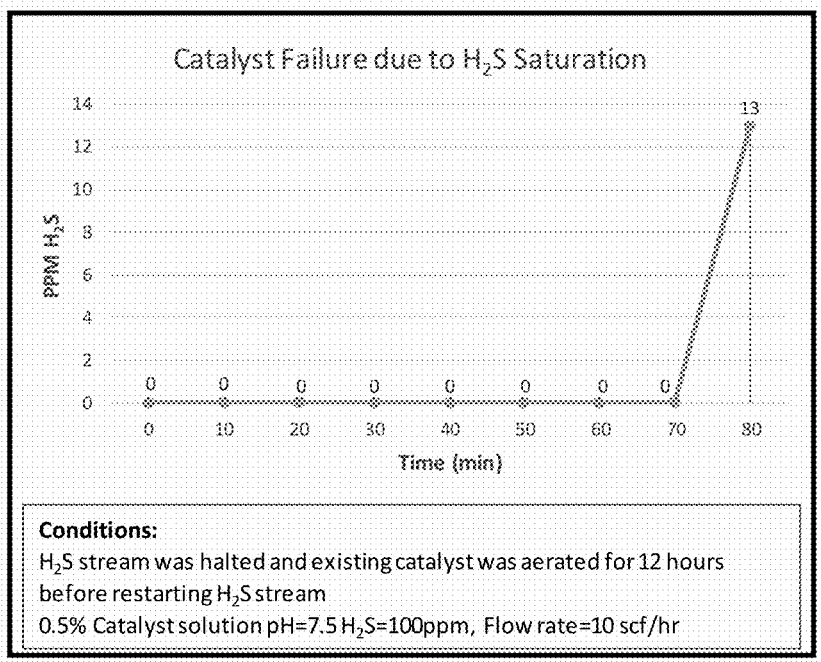
FIG. 4 is a chart showing time to failure after O2 re-activation for Trial 3.

With break-through assure at the end of Trial 2 the system was shut down and diffusion of gas was shifted from hydrogen sulfide with a nitrogen carrier gas to atmospheric oxygen for the next 12 hours. The purpose of this shift was to confirm the efficiency of oxygen as a re-activation approach using the VTX catalyst at approximately ½% concentration from the original VTX concentrate for Trial 3. FIG. 4 is a chart showing time to failure after O2 re-activation for Trial 3. Break-through for the oxygen re-activated VTX catalyst became apparent during the $80^{th}$ minute of Trial 3 with the concentration of hydrogen sulfide moving from approximately zero at minute 70 to approximately 13 ppm at 80 minutes. The previous break-through for Trial 2 began slowly at approximately 30 minutes with approximately 1 ppm and reached approximately 10 ppm by approximately the $90^{th}$ minute, which was not nearly as abrupt as the sudden rise in Trial 3. Therefore, break-through after oxygenation appeared to make the catalyst even more efficient that before re-activation. It is, therefore, probable that some of the iron may have been in the ferrous valence state as opposed to the preferred ferric state. Ferric chloride solutions from suppliers are known to have ferrous iron within a given batch. Chelated ferrous iron would not result in an efficient treatment chemistry. This may be an explanation for the initial inefficiencies noted. Aeration before treatment would be a solution for this problem. Improvement of efficiency was noted after aeration.

Figure 5:
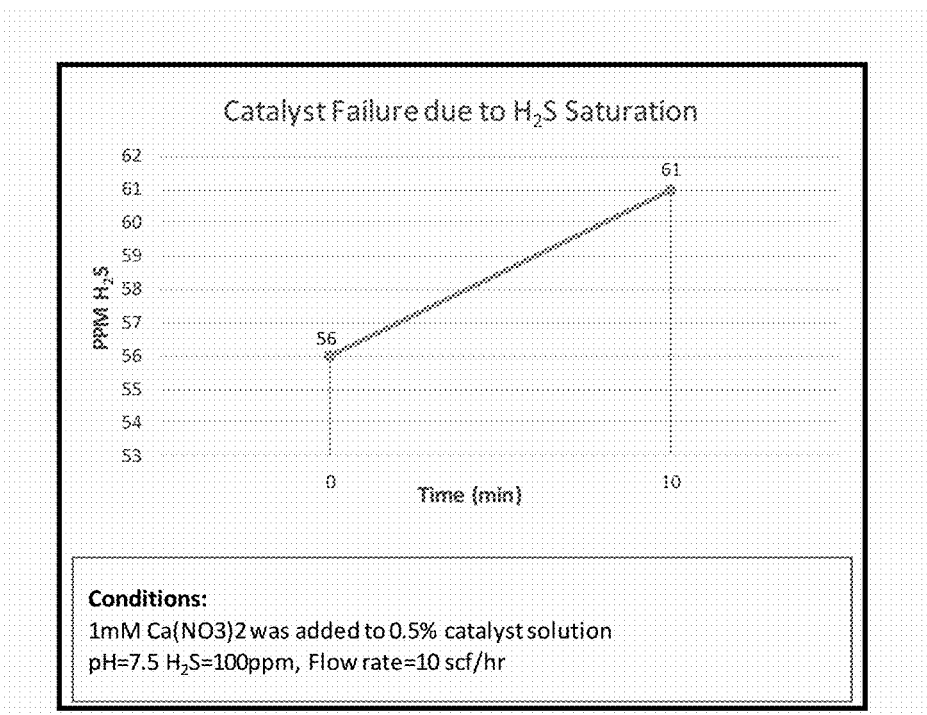
FIG. 5 is a chart showing a failure of calcium nitrate to re-activate.

Trial 4 was an attempt to use approximately 1 mM of calcium nitrate to reset the catalyst after failure. FIG. 5 is a chart showing a failure of calcium nitrate to re-activate. In this case, failure was achieved with hydrogen sulfide rising to approximately 56 ppm before approximately 1 mM of calcium nitrate was added. Ten minutes later the hydrogen sulfide had continued to rise to approximately 61 ppm. It remains a possibility that a much higher dosage and/or a longer re-activation timeframe could work but calcium nitrate was not promising with this result as a re-activation agent.

Trial 5 tested the ability of approximately 48 ppm of hydrogen peroxide to re-activate the catalyst from a approximately 66 ppm of break-through of hydrogen sulfide with approximately ½% VTX solution. After approximately 3 minutes of approximately 48 mg/l peroxide addition the concentration of hydrogen sulfide dropped from approximately 66 ppm to zero ppm indicating that hydrogen peroxide can be an excellent candidate for re-activating the catalyst. It should also be noted that no oxygen was detected by a YSI Oxygen meter in the liquid within the column immediately after hydrogen peroxide addition indicating that any free oxygen was likely utilized within an unknown reaction within the column. This is not surprising within the highly reduced environment within the column.

Trial 6 involved an injection of approximately 5.3 milliliters of approximately 0.11 grams/ml sodium persulfate solution to the column of approximately ½% VTX solution after an approximately 13 ppm break-through concentration of hydrogen sulfide in the treatment unit. The hydrogen sulfide concentration dropped to approximately 1 ppm within approximately 5 minutes. Given the significant dose rate of persulfate it is not likely that sodium persulfate will be a good candidate as a re-activator of VTX catalyst after column failure. However, persulfate is known to have slower reaction times and it did work. It may be a future candidate in combination with other oxidants.

Conclusions:

Atmospheric oxygen (after approximately 12 hours of aeration) and hydrogen peroxide (after approximately 3 minutes) worked very well to re-activate the VTX catalyst. Sodium persulfate also had positive results but the concentration of VTX was high in comparison to hydrogen peroxide. Calcium nitrate showed no positive re-activation effect at the dosage selected. Further work with longer reaction times might be warranted.

Experiment 2—Study of VTX Break-Through of Hydrogen Sulfide and Using Sodium Percarbonate as a Re-Activation Agent and pH Stabilizer Objective:

To test for break-through of hydrogen sulfide at higher input concentration of hydrogen sulfide (from approximately 100 ppm to approximately 200 ppm). Since hydrogen sulfide is mildly acid once dissolved into water, the pH of the VTX treatment liquid will drop over-time. Employing percarbonate as an additive will, theoretically, serve two functions within this experiment. First, it should buffer pH around a range from approximately 7.5 to approximately 8.3 and, secondly, it should re-activate the catalyst when a hydrogen sulfide break-through occurs.

Materials and Methods:

A large pressurized cylinder of hydrogen sulfide gas at approximately 200 ppm within an inert nitrogen gas carrier was employed to deliver sulfide thru the column described in Example 2 above at approximately 5 liters per minute. The gas was bubbled through a fine bubble diffuser into an approximately one-liter solution (approximately 12.9 cm of total liquid column depth) of approximately 0.5% VTX catalyst at an initial pH of approximately 7.56. An Odalog from Detection Instruments described previously confirmed the approximately 200 ppm hydrogen sulfide concentration in raw gas and then served to monitor effluent gas from the column.

A crudely measured assessment of contact time between fine bubbles generated under pressure at approximately 5 liters/minute of unimpeded flow through <approximately 12.9 cm deep column of approximately ½% VTX catalyst put that time at <approximately 1 second. Further studies using more sophisticated methods will be done.

A approximately 150 gram/liter solution of sodium percarbonate was made with distilled water. This solution represented approximately 98 mg/milliliter H2O2 and approximately 52 mg/milliliter of sodium carbonate upon dilution.

Results and Discussion:

The column received approximately 5 liters per minute of approximately 200 ppm hydrogen sulfide for approximately 1.67 hours before a break-through to approximately 31 ppm hydrogen sulfide. A rapid rise in sulfide occurred after this point to exhaustion in less than approximately 5 minutes. The calculated mass of hydrogen sulfide through the column to that point approximated 95 milligrams. This represents approximately 2.78 mM of hydrogen sulfide. At a approximately ½% solution of VTX, the calculated mass of actual iron within the catalyst performing the conversion without re-activation of the catalyst was approximately 4.19 mM Fe. Therefore, a conversion ratio of approximately 0.663 mM of hydrogen sulfide occurred in the presence of each single 1 mM of iron.

Oxygen levels of column solution remained at zero as measured using a YSI

Oxygen Probe within column liquids. ORP of column liquid prior to re-activation was approximately −432 mV.

An injection of approximately 1 mM (1.0 mls) of approximately 1.0 M sodium percarbonate was initiated after breakthrough. Final concentration of hydrogen peroxide from the percarbonate within the one liter of approximately ½% VTX was approximately 95 mg/liter. Added sodium carbonate within the injection fluid would have added approximately 52 mg/l sodium carbonate or approximately 29.4 mg/l of carbonate ($CO_3^=$). The pH before addition of carbonate was approximately 6.92 and it was approximately 7.29 after receiving carbonate. Oxygen levels within the column liquids after re-activation chemistry was injected remained 0.0 ppm meaning that any oxygen generated was quickly reacted and removed as free O2. It would be reasonable to assume that the O2 reacted with hydrosulfide or perhaps available iron or both.

H2S gas injection continued unabated during the injection process. Once the sodium percarbonate injection was complete, the effluent H2S gases dropped from approximately 60 ppm at the moment of injection to approximately 0 ppm in a little over 15 minutes time.

The column remained at zero ppm H2S within effluent gases for approximately 15 minutes, after which, the effluent H2S slowly climbed to approximately 10 ppm over the following approximately 15 minutes. ORP had climbed to approximately −31 mV after re-activation.

The coloration of column liquids upon opening the treatment vessel was black. Attempts to quickly filter this liquid through an approximately 0.47 micron filter did not remove any noticeable solids. A significant dosage of hydrogen peroxide (approximately 200 mg/l) added to the black liquid resulted in an immediate change in color from black to tan and then to yellow after an hour. A repeat of the filtration process was successful in removing most of the yellowish color. The filtrate was back to the golden color of the original approximately ½% VTX catalyst. Elemental sulfur was the likely precipitate filtered.

Conclusions:
The approximately ½% VTX efficiently removed approximately 200 ppm of hydrogen sulfide from a gas stream rapidly bubbled under pressure (at approximately 5 liters/min) through one liter of dilute catalyst at approximately 12.9 centimeters of contact height.
The calculated efficiency of removal prior to re-activation of catalyst was approximately 0.663 moles sulfide/1.0 moles of iron.
Re-activated catalyst using sodium percarbonate was successful but did not result in a completely rejuvenated column, as the time to break-through was approximately 40% that of the initial trial. It is evident that the method holds great promise as pH control and re-activation of the catalyst can occur with one chemical while keeping the system anaerobic and devoid of O2. Elevated O2 will be of major concern within natural gas from wastewater plants, natural gas wells, landfill gas production, and other similar situations.

Reduced conditions within the column leave the spent catalyst black in color leading to a suggestion that the sulfide molecule is maintaining direct contact with the iron within the VTX. Ferric/ferrous sulfide is black as it commonly exists within wastewater systems. Ferric/ferrous sulfide alone, without the benefit of the chelation involved in VTX, is an insoluble black precipitate that often exists within systems where control of sulfide is accomplished by adding ferric or ferrous salts to the wastewater. The black color of the spent column liquid strongly suggests that a bond has formed between the ferric chelant ligand and sulfide (probably as a loosely bound hydrosulfide). It is speculated that this bond remains stable until the Oxidation Reduction Potential of the liquid becomes favorable to allow for an electron shift that pulls the shared electron bonding the ferric (temporarily ferrous) ion on the catalyst and the hydrosulfide to the newly introduced oxidant (excess peroxide from the percarbonate in this case). It is speculated that the black color noticed was a result of incomplete oxidation of the catalyst sulfide complex. More percarbonate would more than likely have taken it to completion (i.e., formation of elemental sulfur).

Experiment 3—pH Control as a Means of Controlling Process Efficiency

The problem of controlling pH within a range of pH 6.3 to pH 9.0 while re-activating the VTX catalyst once that VTX catalyst has been spent while removing elemental sulfur from hydrogen sulfide in a sour gas stream can be uniquely solved by oxidizing the spent VTX catalyst using sodium percarbonate and/or hydrogen peroxide.

Objective:
To diffuse hydrogen sulfide laden gas at approximately 100 ppm through a column of approximately 5% VTX catalyst to assess the effect of pH on the efficiency of the process.

Materials and Methods:
A column built and fitted as depicted in FIG. 2 above was utilized to rapidly assess the working range of pH to include the most preferred pH for conducting treatment of hydrogen sulfide and, potentially, other noxious sulfonated organic compounds. A flow of approximately 5 liters per minute of approximately 100 ppm hydrogen sulfide gas in an inert nitrogen carrier gas was pushed through a fine bubble diffuser into approximately 800 milliliters of approximately 5% catalyst (liquid depth approximately 10 cm). Hydrogen sulfide gas was monitored at the top of the column at the exhaust port by an Odalog supplied by Detection Instruments that was capable of measuring from 0 to 1000 ppm of H2S gas. The pH of the approximately 5% VTX was adjusted to each respective starting pH level with either dilute hydrochloric acid or sodium hydroxide, whichever was appropriate for the target pH. Each test run at respective pH levels was done for approximately 10 minutes.

The method was conducted with and without the addition of calcium nitrate. It was speculated that an improvement (i.e. increase) to oxidation-reduction potential (ORP) might greatly enhance treatment.

Figure 6:
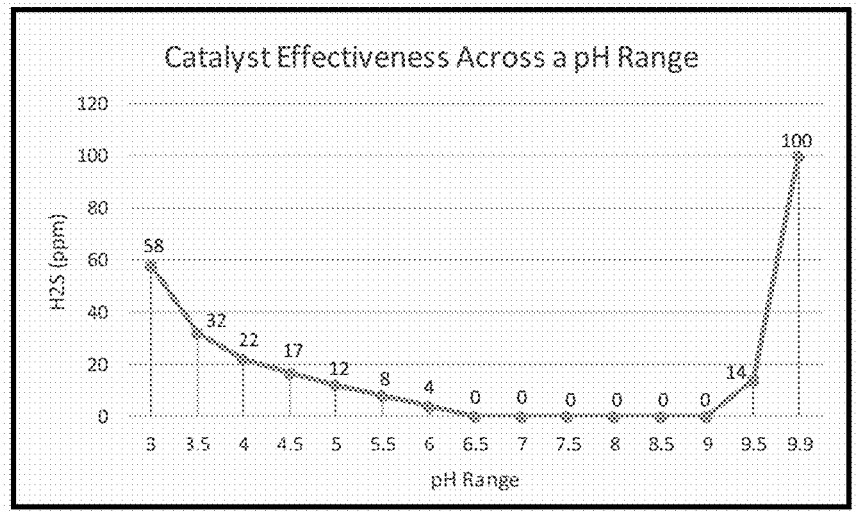
FIG. 6 is a chart of pH vs. VTX catalyst efficiency across a range of pH values.

Results and Discussion:
FIG. 6 is a chart of pH vs. VTX catalyst efficiency across a range of pH values. It was apparent that pH is very important to success of VTX for removal of hydrogen sulfide. For the study without the addition of calcium nitrate, general break-through occurred within the ten minute test procedure from the lowest pH tested (pH of approximately 3.0) through a pH of approximately 6.3. Zero H2S levels were noted from pH approximately 6.5 to approximately 9.0. Some break-through was noted at pH approximately 9.25 when approximately 4 ppm H2S broke through within approximately 10 minutes. An average between the low and high break-through points would suggest that a pH in the middle at approximately 7.75 would be ideal for optimized treatment as it relates to pH. Significant increases in the break-through rate was noted as the pH moved above approximately 9.0 and below approximately 6.3. Complete failure was noted within one pH unit above pH approximately 9, whereas, the loss of efficiency was less notable as the pH dropped from approximately 6.3 to approximately 3.0.

FIG. 7 is a chart of catalyst efficiency over a range of pH in the presence nitrate. The addition of nitrate did improve performance slight at lower pH levels down to pH approximately 5.55, where zero break-through was noted. Break-through began at approximately 5.5 and increased as pH dropped. Failure was first noted at pH approximately 8.8 as the pH moved up. No significant benefit was noted with the addition of nitrate to the system.

Conclusions:
pH control was critical for hydrogen sulfide control using VTX under the conditions of the test.
Failure was first noted in the 'VTX only' test at pH approximately 6.3 on the acidic side and pH approximately 9.25 on the upper side.
The data would suggest that a pH approximating 7.75 (middle of the range) might be optimum for hydrogen sulfide treatment using VTX alone.
Calcium nitrate addition extended the efficiency of treatment to a pH of approximately 5.55 on the acidic side but did not improve performance on the basic end of the scale.
No significant benefit was noted for adding calcium nitrate to improve oxidation potential.

Experiment 4—Use of Oxidation Reduction Potential (ORP) as a Method for Controlling VTX Treatment Column Treatment Efficiency of Hydrogen Sulfide Objective:
To document the slow saturation of active iron sites in order to determine to what extent ORP can be used to predict column failure as pH is held stable.

Methods and Materials:
A large cylinder of hydrogen sulfide and nitrogen gas was used to deliver approximately 200 ppm H2S through the course bubble diffuser (typical aquarium aeration stone) within the constructed column depicted above. Gas was delivered at approximately 5 cubic feet per hour (approximately 141.6 liters/hour). This delivery rate means that a mass of approximately 28.3 mg of sulfide enters the column/hour. The pH was held stable with dilute sodium hydroxide as necessary. After confirming that approximately 200 ppm was within the test gas the Odalog from Detection Instruments was hung above the exit port of the treatment vessel.

Results and Discussion:
FIG. 7 is a table listing sulfide control through ½% VTX as a function of ORP. As noted, the approximately ½% VTX solution began the experiment with a positive ORP of approximately +103 mV and quickly dropped to approximately −73.3 mV when the anaerobic sulfide laden gas entered the column. It was interesting to note that complete control of hydrogen sulfide was not attained until the ORP dropped to the approximately −150 s mV. Only a slight approximately 1-approximately 2 ppm (mostly approximately 1 ppm) of sulfide was breaking through during start-up. This fact has been consistent through several undocumented startups by the author.

The column maintained zero level hydrogen sulfide discharge for over an hour until break-through slowly increased the rate of climb in concentration. The experiment was stopped when approximately 69 ppm hydrogen sulfide broke through. At this point the column was aerated overnite with a common aquarium air pump. The total effective run time (i.e. </=approximately 2 ppm) was approximately one hour and forty-five minutes.

The column was restarted the next day under approximately identical flow conditions and, initially, in an aerobic state before going anaerobic with increasing sulfide gas, with break-through occurring after approximately 2 hours and 5 minutes. Given some leeway for variability it is likely that the two treatments were pretty much equal in performance.

With regards to ORP, both began their respective runs with negative ORP values. Day two, after re-activation, actually outperformed day one results in that no break-through of even a single ppm was noted until after approximately 2 hours of throughput. ORP was and effective indicator of control from approximately −131 mV to approximately −425 mV. Zero ppm hydrogen sulfide predominated results between those numbers.

Conclusions:
Under the conditions of this test, ORP was an excellent control devise with pH being held steady at approximately 7.4-approximately 7.5.
Under conditions of this test, the data suggests that a range of VTX catalyst ORP from approximately −131 mV to approximately −425 mV is the desirable control range for successful control of hydrogen sulfide in gas under anaerobic conditions. Control of ORP within a range from approximately −150 mV to approximately −325 mV would be even more desirable.
It is suspected that controlling pH and ORP within their optimum ranges will be necessary for sulfide treatment success. It is likely that an ORP can be outside of its range of control and pH within its range of effectiveness and there will be a loss of sulfide control and the opposite is also likely true.
The column worked to remove sulfide in an aerobic state (upon initializing treatment) and anaerobically (as anaerobic sulfide gas purged the oxygen).

Experiment 5—Testing to Determine if a Wide Variety of Oxidants Will Re-Activate a Spent VTX Column Objective:
Cursory testing was conducted on a variety of oxidants to determine the effectiveness of each for re-activating a spent VTX column.

Methods and Materials:
A series of tests were done whereby a column containing one liter of approximately ½% VTX at pH approximately 7.5 received approximately 200 ppm hydrogen sulfide gas until break-through occurred. At that point various oxidants were injected in an attempt to re-activate the VTX. The pH was held at approximately 7.5 to begin each test.

Results and Discussion:
Widely variable and unexpected results were obtained in this study. Sodium chlorite worked well to re-activate the catalyst but it's cousin, sodium hypochlorite, did not work at all. Peracetic acid, which actually contains approximately 22% hydrogen peroxide, did not work at all when hydrogen peroxide worked very well to re-activate the catalyst. Sodium percarbonate worked very well and exhibits a positive characteristic in addition to re-activating the catalyst—it also can adjust a falling pH due to hydrogen sulfide presence. FIG. 8 is a table listing results of re-activation with a range of oxidants.

Conclusion:

Some unexpected results were attained in this study as follows:

- Hydrogen peroxide, sodium percarbonate and sodium chlorite can be added to oxygen as oxidants with an ability to re-activate chelated VTX once saturated with sulfide under anaerobic conditions.
- Hydrogen peroxide, sodium percarbonate and sodium chlorite are excellent candidates for controlling the ORP within the acceptable range for fostering treatment of sulfide within gas.
- Sodium percarbonate adds the ability to raise pH while providing oxidation potential as a particularly interesting advantage.
- Other candidates for successful re-activation potential not yet tested include permanganate in all of its forms, persulfate in all of its forms, ozone, chlorate and perchlorate, nitrous oxide, perborate, 2,2 dipyridyldisulfide, peroxydisulfuric acid and peroxymonosulfuric acid.
- Combinations of all candidates add some interesting possibilities, particularly when considering sodium percarbonate and hydrogen peroxide combinations which would add pH control to an ability to boost oxidation potential in the combination.
- Nitrous oxide could add some unique abilities to control sulfide inside of landfills or natural gas fields in combination with VTX because, as a gas, it might be more easily distributed to areas of need and because it is not as potent an oxidizer in the presence of flammable gases.
- In all cases where peroxides were used, the re-activated medium would be reused in an aerobic state.

Experiment 6—Proof of Concept at Indian River Natural Gas Field Near Jamestown, Tenn.

Objective:

To test the VTX Catalyst at Indian River Natural Gas Well Site with problematic Hydrogen Sulfide issues Materials and Methods:

An approximately 20" diameter and approximately 7' tall column was constructed to withstand up to 300 psi of well pressure to provide a vessel for bubbling natural gas through VTX to test the real world potential of the technology. The column had a port on the bottom for delivering natural gas. The gas entered the column from the well and was immediately directed through a diffuser system that was simply a plate of steel inside of the column with hundreds of approximately $1/16^{th}$ inch holes drilled into it. Natural gas escaped from the holes and moved up through approximately 30 inches of approximately 5% VTX that was pH controlled, using a pH controller from IPW, Knoxville, Tenn. to raise or lower the pH by automatically injecting caustic soda or hydrochloric acid as needed, at or near a pH of 7.0 (i.e., at between approximately 6.5 and approximately 7.5). Half inch plastic column packing provided significant surface area for the gas to pass over as it moved up through the column. After passing through the packing, the natural moved to the top of the column and out to the collection system.

Figure 9:
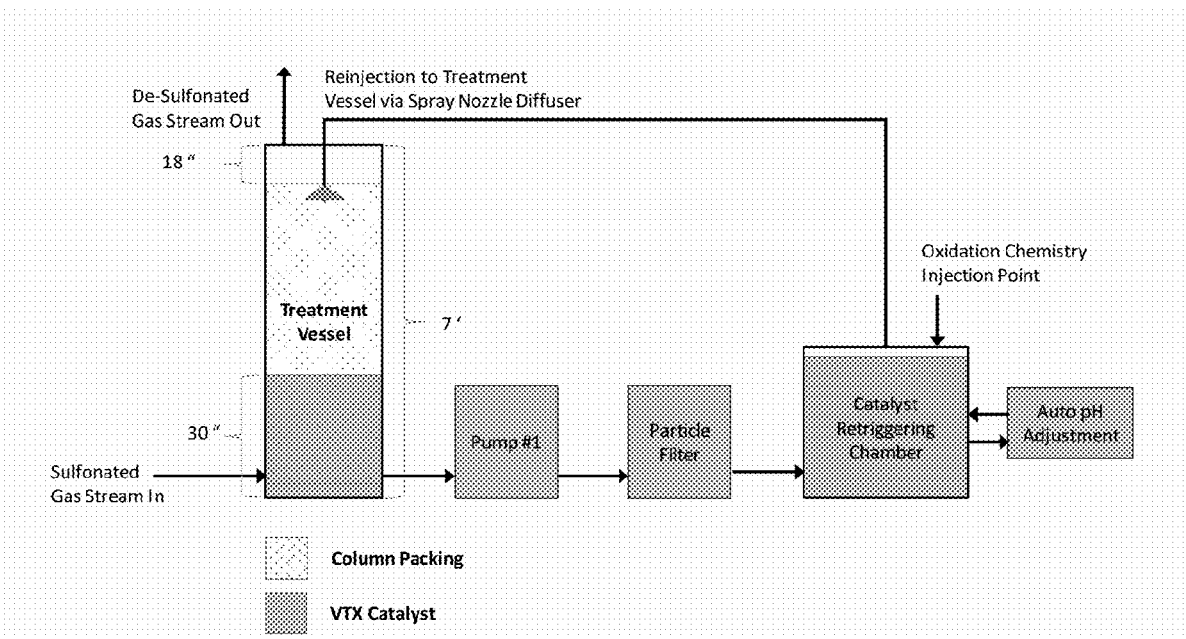
FIG. 9 is a schematic of the general flow scheme of the test unit.

Liquid VTX catalyst was constantly moved from the bottom of the column to a sedimentation tank for settling any elemental sulfur that formed. The pH was kept within range within this same tank using dilute caustic soda. Aerobic VTX was collected at the end of this tank and returned to the top of the column where it was sprayed down across the column packing to provide additional contact. FIG. 9 is a schematic of the general flow scheme of the test unit.

Incoming and outgoing ports for collecting samples of natural gas were built into the system. A constant slip-stream of gas was tested for hydrogen sulfide content using an Odalog from Detection Instruments. In general, this system ran continuously for approximately 8 to approximately 12 hour stretches for a total of approximately two weeks of onsite treatment. Data was gathered through a variety of flow rates. Hydrogen sulfide concentration within the gas varied but typically ranged from approximately 80 to approximately 115 ppm. Flow volumes also varied from approximately 850 Mcf to approximately 1.9 Mmcf and many points in between. Re-activation of the VTX catalyst was accomplished via exposure to atmospheric oxygen at the pH adjustment tank.

Figure 10:
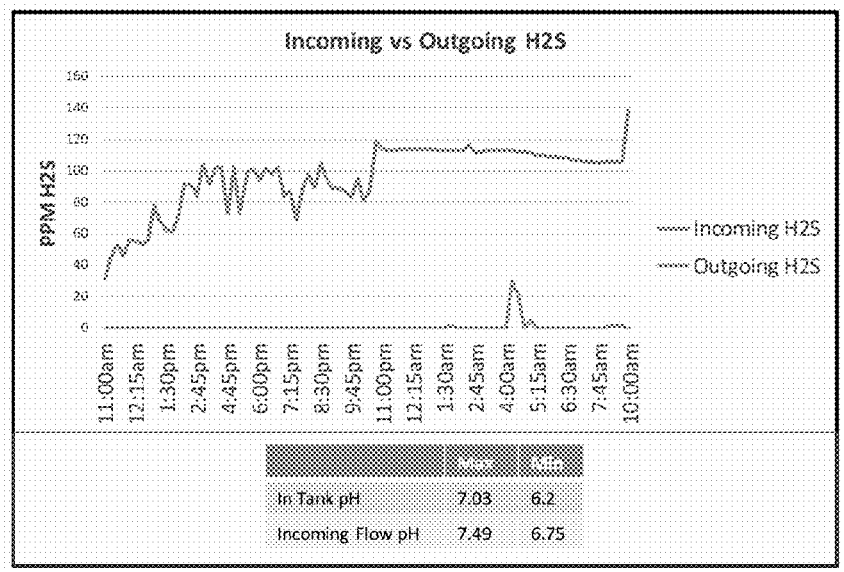
FIG. 10 is an Odalog graph of hydrogen sulfide.

Results and Discussion:

It can be categorically stated that the setup as described never exhibited break-through while VTX catalyst was in the system as designed. This means that the system rarely left zero ppm hydrogen sulfide which was easily 95% of the time spent that this site. When the system did leave zero it was invariably because chemical was either lost down the natural gas line, leaving very little VTX on top of the diffuser or because we were returning too much chemical through the solids control tank and, therefore, did not have chemical enough above the diffuser. Other than the issue of not having enough chemical in contact with the problem and a proper method for elemental sulfur removal, this exercise was a complete success. FIG. 10 is an Odalog graph of hydrogen sulfide for a typical test run at the Indian River, Tenn. natural gas well. The failure hydrogen sulfide breakthrough noted on the graph occurred when the VTX catalyst within the column dropped below the diffuser.

Build-up of elemental sulfur in the system can be problematic. Simple sedimentation might not be the solution.

Conclusions:

- The aerobic or anaerobic VTX catalyst works very efficiently for treating large volumes of natural gas contaminated with hydrogen sulfide.
- Certain exemplary embodiments can gain total control over sulfide in natural gas under the conditions of the test as described.
- Removal of elemental sulfur via an efficient filtration system might be critical to long term success.
- In addition to mechanical control, close control of pH and ORP might be essential.

Experiment 7: Comparing Treatment Efficiency Between Three Selected Ferric Chelants Using Hydrogen Peroxide as a Rapid Re-Triggering Agent Introduction:

The combination of ferro chelants and peroxide, percarbonate, persulfate and other oxidants has not been demonstrated for treatment of hydrogen sulfide within methane gas from landfills, within wastewater plant scrubbers, within natural gas, within natural gas from wastewater treatment digesters, or similar operations.

Ferric/ferrous iron has a natural affinity for sulfide. Ferric/ferrous iron will react with sulfide on contact to form an insoluble product. Chelated iron may react differently than free iron through a reaction that will bind with sulfide but not insolubilize the sulfide. Then, once captured by the ferric chelant, the chelated iron can readily react with a strong oxidant to either produce hydroxyl radicals or react with the bond between the sulfide and chelated iron to take electrons from the sulfide molecule or both. Such a reaction can free sulfur to form elemental sulfur and/or sulfite, sulfur dioxide, sulfate, among others. The form of sulfur taken after such a reaction is most likely pH dependant. Oxidation of sulfide at circum-neutral pH with a strong oxidant can form elemental sulfur, while oxidizing sulfide at elevated pH tends to form more sulfur compounds at a higher oxidation state.

A bonus that can be realized by such chemistry is the extremely rapid and efficient treatment of sulfide within a gas stream bubbled up through a column containing an efficient ferro chelant. The ferro chelant can capture the sulfide within a recirculation system and/or can bring the solutions from inside of the column to a reactor for addition of small amounts of a strong oxidant. Oxidant addition can result in an extremely efficient system for converting hydrogen sulfide to elemental sulfur in conjunction with close pH control.

Column Description and Dimensions:

The column included a glass Pyrex® cylinder with perforated, glass sparging plug at the bottom of the cylinder, and a Teflon® valve within a 50 mm diameter×550 mm milliliter glass tube capable of holding approximately 1100 milliliters of liquid. The glass tube was "necked down" from a glass sparging plug to a Teflon within glass valve followed by ~13 mm glass tubing to accommodate flexible Teflon tubing to connect a flow meter and H2S gas cylinder. The glass cylinder was secured onto a ring stand by common ring stand clamps. No column packing was utilized, which likely will decrease efficiency of removal as the contact time will be different from previous studies.

Concentrations of Selected Ferric Chelates (as Iron):

Ferric MGDA=42% to 45% solution by weight, chelating ~40 grams/liter of iron

Ferric Gluconate=19%-23% solution by weight, chelating ~32.5 grams/liter of iron Ferric EDTA=42% to 45% solution by weight, chelating ~40 grams/liter of iron Method for Monitoring Hydrogen Sulfide Escaping the Treatment Column:

An Odalog Model L2 Hydrogen Sulfide test unit from Detection Instruments, 5815 N. Black Canyon Highway, Phoenix, Ariz. 85015 capable of testing a range of atmospheric hydrogen sulfide from 1 to 1,000 ppm was selected to continuously monitor (once every 5 minutes) hydrogen sulfide concentration within gases escaping the gases being sparged through iron chelate test solutions and controls of the test cylinder. The Odalog Test unit was calibrated using a certified 100 ppm hydrogen sulfide calibration gas from Custom Gas Solutions, 1750 East Boulevard, Durham, N.C. prior to each study per the protocol referenced by the manufacturer.

Hydrogen Sulfide Test Gas:

A calibration gas cylinder of 200 ppm hydrogen sulfide test gas (nitrogen gas carrier) purchased from Custom Gas Solutions North Carolina was utilized as a source of gas for sparging through one liter of each of the three solutions being tested for sulfide removal efficiency. The rate of sparging was set at 2 cubic feet per hour (0.0566 cubic meters per hour) for all test scenarios. Forcing gas through the test column purged all dissolved oxygen in a short period of time and the system remained anaerobic as long as gas was flowing.

Ferric Chelate Solutions (One Liter):

Concentrated ferric chelate solutions, namely Fe-EDTA and Fe-MGDA, were made by adding 1.434 M of dry chelant (tetrasodium EDTA or trisodium MGDA, respectively to 0.728 M of ferric iron salt (as Fe) per liter of test solution or approximately 2 moles of chelant per 1 mole of iron. Each Ferric-EDTA and Ferric-MGDA solution received distilled H2O to a total volume of 900 milliliters. The pH then was adjusted to 7.0+/−0.2 units with dilute HCl (5%) and topped off to one liter with distilled H2O.

Sodium gluconate (1.0 M) was first diluted to 700 milliliters with distilled H2O and the pH adjusted to and held at pH 11.0. Ferric iron salt then was added at 0.59 M Ferric. The ingredients were then mixed until the iron was fully chelated by the gluconate (~5 minutes). The pH then was reduced to a pH of 7.0+/−0.2 units with HCl and the mixture topped off to one liter with distilled H2O. The resulting ratio of Gluconate to iron molar ratio then was ~1.7 chelant to 1.0 moles of iron.

Typical Study Conditions:

Ferric chelants were added at a rate of 5 milliliters of concentrated solution up to one liter of distilled water with the exception of one test of a higher concentration of Ferric Gluconate (25 milliliters added). The pH of the various test solutions containing the ferric chelants were then pH adjusted to ~7.0+/−0.2 units with dilute caustic or hydrochloric acid using a calibrated Acorn pH meter. Each solution was then added to the column to begin gas flow through the column. In selected studies, the column was loaded with distilled water and pH adjusted to ~7.0 with H2S gas added to the system in order to gain some information as to how quickly sulfide levels rose in the column without ferric chelants involved.

Hydrogen sulfide gas was administered from a large compressed gas cylinder through gas pressure/flow regulators, then through an in-line gas flow meter and into the test column.

Once the columns were ready for the study to begin, the Odalog was activated to the hydrogen sulfide data logging setting and placed on top of the column to semi-continuously test for hydrogen sulfide gas escaping from the top of the column. As previously mentioned, gas was set to flow through the column at 2 cubic feet per hour (0.0566 cubic meters per hour) for all test scenarios or about 11.5 mg/hour. The Ferric EDTA and Ferric MGDA studies contained 200 mg of ferric iron within each of the one-liter test solutions. The Ferric Gluconate test column in test one for that chelant contained 162.5 mg/l of ferric iron and 812.5 mg/l of ferric iron in test two of the Ferric Gluconate studies, respectively.

Tests were conducted until a breakthrough was witnessed. Studies were either halted at that point or allowed to continue breakthrough to a point where the H2S gas was discontinued and atmospheric oxygen added through the sparging disk within the column to test for the retriggering effect of the ferric chelants. Retriggering allowed for a reaction to take place between the ferric chelate-bound sulfide and hydrogen peroxide. It is theorized that this reaction resulted in the rapid disassociation of the sulfide from the ferric chelant and production of elemental sulfur or an oxidized version of sulfur at neutral pH, leaving the ferric chelant to take on more sulfide with each retriggering event.

Figure 11:
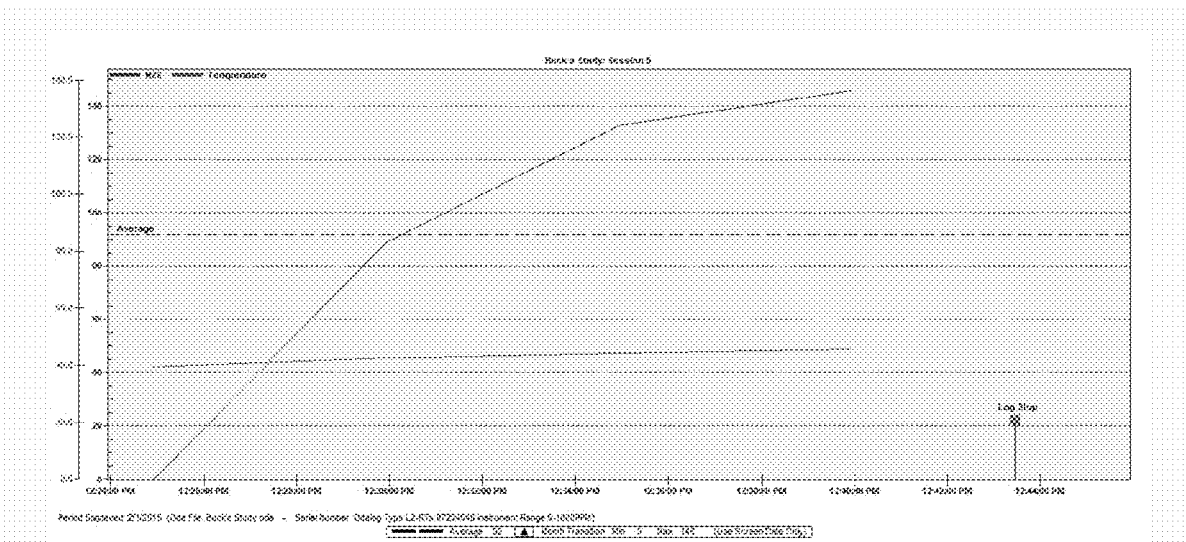
FIG. 11 is a graph of hydrogen sulfide measurements.

Results and Discussion:

FIG. 11 is a graph of hydrogen sulfide measurements in five-minute increments after 200 ppm of hydrogen sulfide gas passes through the test column, and depicts the rapid rise in hydrogen sulfide in gas escaping the column without the benefit of treatment chemistry using three ferric chelates. Hydrogen sulfide concentrations rose from zero to over 140 ppm hydrogen sulfide in 25 minutes. Some dissolution of hydrogen sulfide likely was happening during the early stages of exposure. It is likely that a equilibrium was established at a pH of 7.0 (the pH of the test solution) within the control water between dissolved hydrogen sulfide and hydrosulfide whereby both forms of sulfide were present at very nearly a 50/50 ratio until the test hydrogen sulfide gas being bubbled through the column resulted in saturation of sulfide at the ambient temperature and pressure of the test. This graph shows the steady rise of hydrogen sulfide as this process proceeds.

Figure 12:
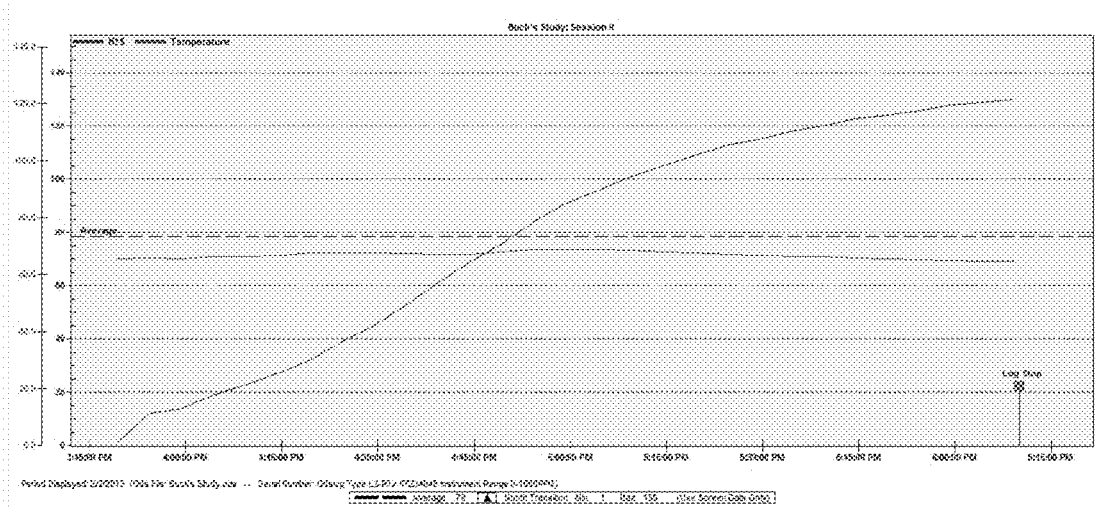
FIG. 12 is a graph of hydrogen sulfide measurements.

FIG. 12 is a graph of hydrogen sulfide measurements in five-minute increments after 200 ppm of hydrogen sulfide gas passes through the test column, and showing the steady rise in hydrogen sulfide escaping the column containing 200 mg/l of ferric iron chelated with EDTA. The rise in sulfide escaping the column is steadily increasing over ~2½ hours from zero to about 130 ppm. Removal of hydrogen sulfide clearly outperforms the control over this period of time, however, the Ferric EDTA was not successful in removing hydrogen sulfide sufficiently to achieve zero ppm within the conditions of this study.

Figure 13:
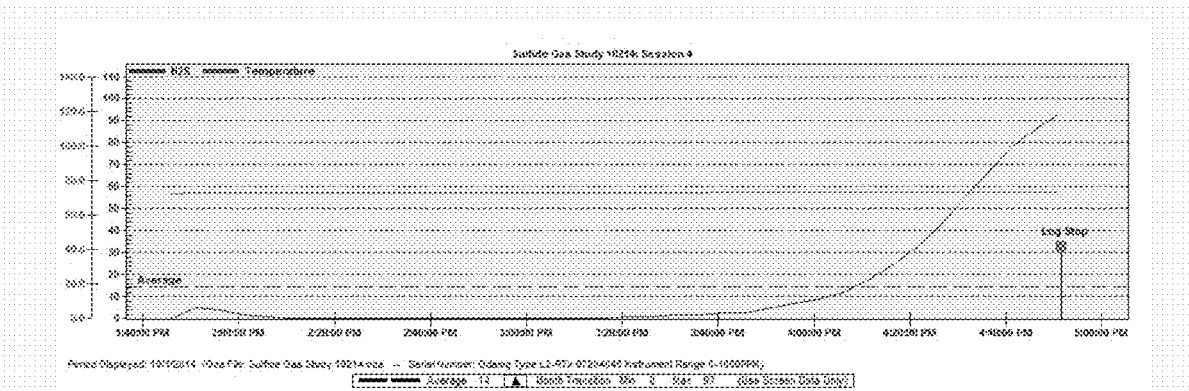
FIG. 13 is a graph of hydrogen sulfide measurements.

FIG. 13 is a graph of hydrogen sulfide measurements in five-minute increments after 200 ppm of hydrogen sulfide gas passes through the test column, and showing a slow rise in hydrogen sulfide escaping the column with hydrogen sulfide levels within the gas rising to about 6 ppm as the study begins for in the ferric gluconate solution with 162.5 mg/l of ferric iron chelate, (as iron). The ferric gluconate was injected at the top of the early rise of sulfide to begin the study at ~1:50 pm. A slow decline can be noted after the ferric gluconate injection to zero ppm of hydrogen sulfide at ~2:10 pm. The hydrogen sulfide remained at zero until just before 3:20 pm when a slow rise in hydrogen sulfide can be noted. During the time zero ppm was registered about 13.2 ppm of hydrogen sulfide was captured within the ferric gluconate or a ratio of 12.3 mg of ferric iron available within the ferric gluconate per 1 mg of sulfide removed.

Figure 14:
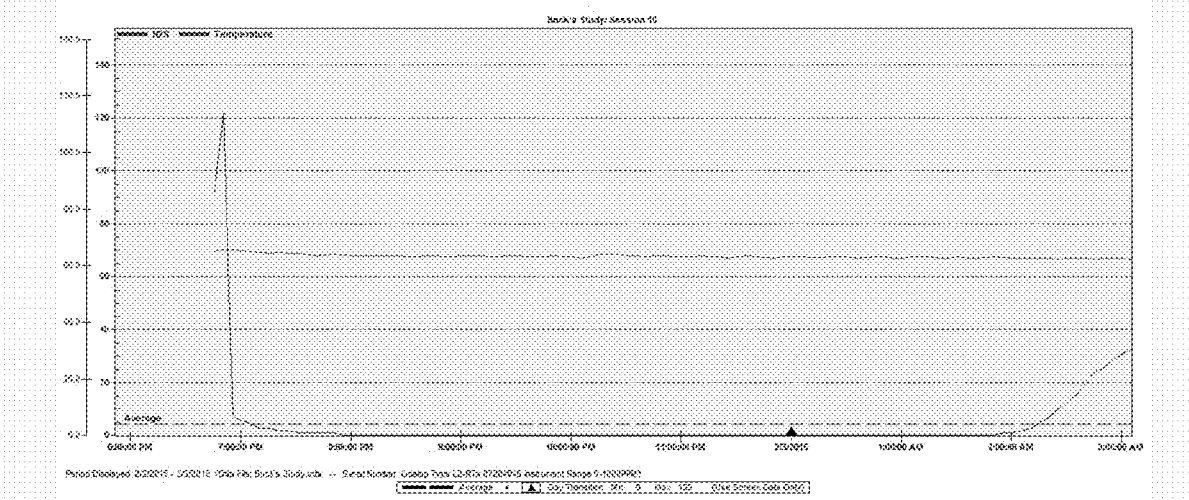
FIG. 14 is a graph of hydrogen sulfide measurements.

FIG. 14 is a graph of hydrogen sulfide measurements in five-minute increments after 200 ppm of hydrogen sulfide gas passes through the test column, and shows a considerable increase in chelated ferric iron concentration using gluconate as the chelant. The previous gluconate study used 162.5 mg/l chelated ferric iron as compared to 812.5 mg/l ferric iron within this study. It is clear that higher concentrations of chelated ferric iron resulted in of nearly identical removal efficiencies as it relates to total chelated iron available (about 12 mg iron per 1 mg of sulfide removed. After allowing the test column to be exposed to hydrogen sulfide without ferric gluconate to achieve significant breakthrough of hydrogen sulfide (rise to 120 ppm on left side of graph), the column was dosed with 812.5 mg/l ferric gluconate (as iron). Immediately upon dosage, the level of hydrogen sulfide within the gas escaping the column dropped precipitously to zero and remained at zero for approximately 6 hours after which the levels began to rise as the column failed. An analysis of the amount of sulfide removed from the point at which the column hit zero to begin the study to the point at which the column began to fail, about 68 mg of sulfide was removed from the gas stream or about 12 mg of ferric iron per 1 mg of sulfide removed, which was very similar removal ratio of ferric iron to sulfide removed demonstrated in FIG. 4 above (12.3 mg).

Figure 15:
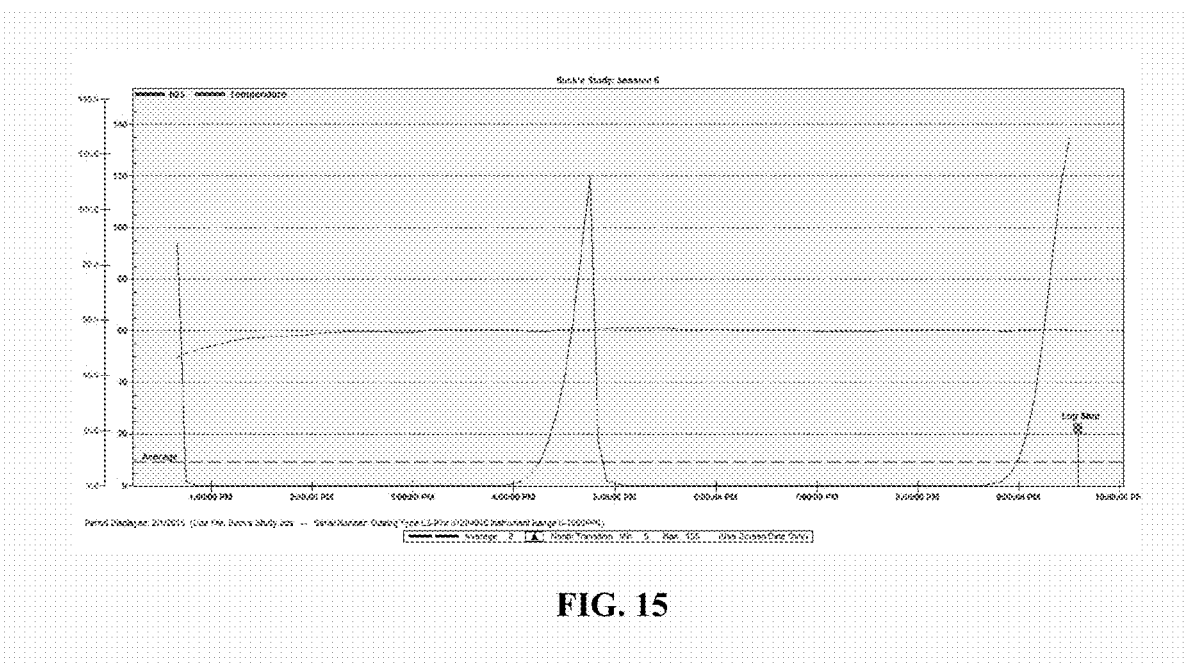
FIG. 15 is a graph of hydrogen sulfide measurements.

FIG. 15 is a graph of hydrogen sulfide measurements in five-minute increments after 200 ppm of hydrogen sulfide gas passes through the test column, and depicts two phases of sulfide removal using Ferric MGDA with 200 mg/l ferric iron. The column received 200 ppm hydrogen sulfide prior to the addition of Ferric MGDA until the concentration of the hydrogen sulfide exiting the column rose to 95 ppm. At this point, Ferric MGDA was added to achieve a chelated iron content of 200 mg/l. Immediately upon addition the hydrogen sulfide levels exiting the column dropped to zero and remained at zero for about 3.15 hours. A calculation of sulfide removed over this period of time shows that 35.7 mg of sulfide was removed representing a 5.6 mg of ferric iron to 1.0 sulfide ratio for removal during this period of time.

After the column began to fail it received additional sulfide loading until the amount of sulfide exiting the column rose to 120 ppm hydrogen sulfide. At this point the column was infused with 20 mg/l of hydrogen peroxide using a microliter pipette. Sulfide gas entering the column provided mixing for approximately 2 minutes before levels of hydrogen sulfide exiting the column returned to zero. The column was almost black in color prior to oxidizing it with peroxide. After oxidation the column lightened in color to a creamy yellowish color. The level of hydrogen sulfide immediately fell to zero after oxidation and remained at zero for 3.75 hours. A calculation of sulfide removed after oxidation shows that 42.5 mg of sulfide was removed during the treatment period from its first fall to zero to the point at which the hydrogen sulfide began to rise above zero. This represents an improvement from the first phase of treatment from 5.6 mg of ferric per 1.0 mg sulfide available to a removal rate of 4.7 mg ferric per 1.0 mg sulfide removed. Oxidation using hydrogen peroxide verifies that it is capable of rapidly retriggering sulfide saturated Ferric MGDA to accept additional sulfide. The exact mechanism is unclear but peroxide addition to ferro-chelants likely produces free hydroxyl radicals that greatly increase the oxidation potential necessary to convert the sulfide to elemental sulfur at neutral pH. It is also possible that loosely ferro-chelant bound, hydrosulfide molecules react with peroxide alone to oxidize the attached sulfide, thus freeing it to become elemental sulfur or an oxidized version of sulfur (pH dependent). Either or both of these mechanisms might play a role. It is notable that less hydrogen peroxide was necessary to achieve retriggering of the Ferric MGDA than the amount of hydrogen peroxide added. It would seem logical that a stoichiometric 1:1 relationship might exist in the reaction that retriggers the Ferric MGDA but this was not the case.

It was clear from these studies that a significant variability exists between the various ferric chelates for removal of hydrogen sulfide within a gas. Ferric EDTA and Ferric MGDA are within the same class of chelating agents (i.e., aminocarboxylates), yet they behave very differently as agents for removal of hydrogen sulfide as it relates to efficiency of removal at nearly identical concentrations as ferric chelant and sulfide exposure levels.

It should also be noted that the coloration of test solutions after extended exposure to hydrogen sulfide was variable. The Ferric EDTA solution remained a reddish brown color while the Ferric MGDA turned black with exposure to similar concentrations of hydrogen sulfide. The black coloration remained until it was oxidized by small doses of hydrogen peroxide. The Ferric MGDA solutions turned from black to a cream to yellow color. Filtration of this liquid after the second test event in this study resulted in the removal of insoluble particles that could only have been elemental sulfur. The filtrate returned to the same general reddish brown color of the original liquid before exposing it to hydrogen sulfide. The Ferric Gluconate solution became black upon exposure to hydrogen sulfide gas and remained black after exposure to 20 mg/l of hydrogen peroxide.

Filtration of this liquid resulted in removal of a black precipitate and the filtrate returned to the reddish brown color prior to exposure to hydrogen sulfide. Clearly, the chemistry associated with the removal of sulfide with these two ferric chelates resulted in significant removal efficiencies but varied with regards to the coloration of the insoluble particulates created, suggesting a variation within the reaction chemistry between the two products.

It was clear that the Ferric MGDA was significantly superior with regard to removal efficiency overall as compared to both Ferric EDTA and Ferric Gluconate.

Use of small quantities of hydrogen peroxide to retrigger the failing ferric chelate was rapid and efficient. Hydrogen peroxide addition produced a cream to yellowish colored insoluble product as a result of the oxidizing effect. The insoluble product was reasonably assumed to be elemental sulfur. The fact that the Ferric MGDA was immediately brought back to rapid hydrogen sulfide removal efficiency for the test gas leads to the conclusion that elemental sulfur was the only logical product filtered out of the liquid.

Conclusions:
Ferric EDTA, Ferric Gluconate and Ferric MGDA vary considerably in their efficiency in removing hydrogen sulfide from gas using very similar concentrations.

The two Ferric chelates in the aminocarboxylate class tested, Ferric EDTA and Ferric MGDA, were widely different with regard to their efficiency, using identical molar dosages of iron and chelant in the formulations. Ferric EDTA was a poor in removing hydrogen sulfide from the test gas at the concentration tested, whereas, the Ferric MGDA concentration was very effective in removing hydrogen sulfide from the test gas.

Ferric Gluconate removed hydrogen sulfide from the test gas resulting in a black color after saturation with sulfide. However, the black color remained after exposure to hydrogen peroxide unlike the Ferric MGDA that produced a black colored liquid in the column after saturation but was quickly oxidized to a light cream to yellow color upon contact with hydrogen peroxide.

Exposure to 20 mg/l of hydrogen peroxide resulted in retriggering of the Ferric MGDA within approximately 2 minutes. Removal of hydrogen sulfide returned to high efficiency of removal with zero ppm hydrogen sulfide at a slightly greater saturation efficiency than the initial sequence without peroxide.

The molar ratio of chelant to iron in the formulation for the two aminocarboxylates (Ferric MGDA and Ferric EDTA) was approximately 2.0 moles of chelant to 1.0 moles of iron. Ferric MGDA was an effective hydrogen sulfide removal agent at this ratio and Ferric EDTA was not effective.

The molar ratio of gluconate chelant to iron was approximately 1.7 moles chelant to 1.0 moles of iron. The Ferric Gluconate was an effective agent for removal of hydrogen sulfide at this ratio but not as effective as Ferric MGDA by over a 2 to 1 ratio.

A workable ratio with regards to the concentration of iron necessary to achieve complete treatment of hydrogen sulfide under test conditions using Ferric Gluconate as formulated was approximately 12 mg/l of ferric gluconate (as iron) to 1.0 mg/l of sulfide (as sulfur) under the conditions of the study.

The apparent ratio of the concentration of iron necessary to achieve complete treatment of hydrogen sulfide under test conditions using ferric MGDA as formulated was approximately 4.7 to 5.6 mg/l of ferric MGDA (as iron) to 1.0 mg/l of sulfide (as sulfur).

Ferric MGDA was the most efficient of the chelated products by a wide margin. Ferric gluconate proved better than Ferric EDTA by a large margin. Ferric gluconate proved to be an adequate sulfide removal chemical at both concentrations, 162.5 mg/l and 812.5 mg/l Ferric Gluconate (as iron).

Ferric EDTA did not prove to be an effective removal chemistry at the concentrations tested, although it did work to some degree. It is likely that much higher concentrations of Ferric EDTA would prove effective.

None of the ferric chelates were formulated with enough iron to satisfy all of the receptor sites for iron. The MGDA and EDTA have significantly more receptor sites for iron, in particular. Three receptor sites for each MGDA molecule and four sites for each EDTA molecule. The ratio of chelant to iron was approximately 2:1 for the two aminocarboxylates. For the Ferric Gluconate the ratio was 1.7:1.0 chelant to iron It is believed that certain efficiencies are gained for MGDA in particular in not filling most or all receptor sites on the chelant molecule. EDTA did not seem to benefit from this strategy.

The lack of column packing in this study appeared to take away from overall efficiency as compared to previous studies using column packing Extending contact time, therefore, should be a key design consideration going forward.

Certain exemplary embodiments can provide one or more:
methods for the catalytic removal of hydrogen sulfide (H2S) gas from a sour gas stream using one or more aminocarboxylate-containing catalysts;
compositions adapted to remove gaseous H2S from a sour gas stream, each composition comprising an aminocarboxylate-containing metal chelate complex;
methods for using an aminocarboxylate-containing metal chelate complex for removing H2S gas from a sour gas stream; and/or
methods for controlling the catalytic removal of hydrogen sulfide (H2S) gas from a sour gas stream using one or more aminocarboxylate-containing catalysts; and/or
methods for re-activating aminocarboxylate-containing catalysts used to remove hydrogen sulfide (H2S) gas from a sour gas stream.

Experiment 8: Visual Example of Rapid Color Change After Peroxide Addition

Objective: To visually demonstrate the rapid formation of reacted sulfide with Ferric MGDA and, subsequently, the rapid change from the reacted sulfide attached to Ferric MGDA to sulfur with hydrogen peroxide addition.

Conditions: Injected one milliliter of pH 7.0 adjusted hydrosulfide at ~10 mg/milliliter into Ferric MGDA and distilled water solution (one liter) to demonstrate immediate formation of black coloration of ferro-sulfide bond formation. The sulfide-iron bond is, classically, black in color. A black stream of liquid instantly formed upon injection.

Mixed the reacted sulfide and Ferric MGDA solution to gain uniform coloration and then immediately added 10 mg/l H2O2 to oxidize sulfide. The completely mixed solution became black in color with mixing but minimally translucent. The addition of hydrogen peroxide followed by mixing of the flask resulted in a very rapid color change from black to a milky cream color.

Subsequent filtration of the resulting liquid through a 0.45 micron filter resulted in a return of the original coloration of the Ferric MGDA solution in the filtrate. The filter was a light creamy color of the solution.

Rapid treatment of captured sulfide to elemental sulfur is essential to design an efficient, low cost system.

Experiment 9: Ferric MGDA Sequestered Sulfide and Elemental Sulfur Production.

Objective:

To demonstrate that sequestered sulfide oxidation results in elemental sulfur production at elevated pH.

Background:

pH can be a determining factor as to which oxidation state sulfide ends up in after oxidation with peroxide. As the pH moves above 7.0, sulfide oxidation shifts more towards producing sulfite and sulfate with peroxide as an oxidizing agent. Cursory information gathered during a full-scale pilot study at the Indian River Gas Field, Jamestown, Tenn. where the applicant treated natural gas by utilizing Ferric MGDA as a sequestering agent for sulfide indicated that conversion of sulfide to elemental sulfur was still occurring in a significant manner as pH occasionally climbed about 7.5. Studies were conducted to determine if this was true under more controlled conditions of a lab.

Ferric MGDA can be used with success in treating hydrogen sulfide in wastewater. A potential advantage of the process when used with hydrogen peroxide lies in the production of hydroxyl radicals. Hydroxyl radicals are much more potent oxidizers than peroxide alone. Treatment of sulfide with this method results in a far faster treatment of sulfide and consistently less peroxide needed for accomplishing treatment as compared to use of peroxide alone. This is particularly true as the pH begins to rise and the demand for peroxide goes up as more and more oxygen is needed to oxidize the sulfide to sulfite and sulfate. It is surmised that the reduced demand for peroxide in treating sulfide in the presence of Ferric MGDA had everything to do with hydroxyl radicals reacting with sequestered sulfide at ferric—sulfide bonds on the Ferric MGDA molecule to take an electron from the hydro sulfide molecule and releasing it as a free sulfur atom to react with other free sulfur atoms to form insoluble homocyclic sulfur molecules, $S_6$, $S_7$, and $S_8$.

Methods:

A series of 250 milliliter flasks received 95 milliliters of distilled water buffered with 100 mg/l of sodium bicarbonate and pH adjusted to a target pH. The pH range selected was from 7.0 to 7.8 in 0.2 increments. Three flasks were prepared for each increment plus a control sample that received Ferric MGDA and hydrogen peroxide only (no sulfide addition) along with requisite pH adjustment for each pH increment. Each flask was individually dosed at 50 mg/l (+/−2 mg/l) with hydrosulfide (made up from technical grade hydrosulfide flake with verification of concentration measured using a standard Hach methylene blue test through a DR 2000 Spectrophotometer). The pH was adjusted as necessary and treated quickly thereafter with 0.2 milliliters of concentrated FeMGDA and 75 mg/l dosage of H2O2 (7.5 mg/100 mls). The pH was quickly readjusted as necessary a final time to the target pH as necessary after addition of the pH adjustment ingredients (dilute NaOH or HCl).

After final treatment of all flasks and a 5-10 minute contact time, all 20 flasks were filtered through a GF/F glass fiber filter prepared and pre-weighed per EPA Standard Methods for Water and Wastewater Method 340 directives for total suspended solids testing. After drying and desiccation per EPA protocol, the samples were weighed using a digital balance with accuracy to 0.1 mg.

Results:

Table 3 presents data that indicates uniform solids production around the expected 50 mg of insoluble elemental sulfur production. Since the coloration of the particulates within the liquid and the filtered solids was a creamy to yellowish color indicative of sulfur with no hint of the red color imparted by iron oxidation within the Ferric MGDA, it is surmised that essentially all of the solids reported in this table are due to insoluble sulfur molecules. Further the uniform data overall between the various replicate sets for each pH rise represent further proof of uniform elemental sulfur formation with a rise in pH to 7.8.

Table 3. Total Suspended Solids Production with Ferric MGDA and H2O2 Dosage Across a pH Range of 7.0 to 7.8 in a 50 mg/l Sulfide Test Solution.

| | Total Suspended Solids, mg/l | | | |
|---|---|---|---|---|
| Study pH | Rep. 1 | Rep. 2 | Rep. 3 | Control |
| 7.0 | 49.1 | 53.8 | 46.0 | 1.2 |
| 7.2 | 47.4 | 47.5 | 51.1 | 2.4 |
| 7.4 | 46.5 | 50.9 | 51.4 | 2.3 |
| 7.6 | 51.6 | 49.9 | 49.2 | 1.9 |
| 7.8 | 52.3 | 47.0 | 47.7 | 3.1 |

Conclusions:

Oxidation of sulfide between the pH of 7.0 to 7.8 using Ferric MGDA and hydrogen peroxide results in an efficient conversion of sulfide to insoluble elemental sulfur.

Conversion rates of sulfide to elemental sulfur across the pH range from 7.0 to 7.8 are very nearly equal for a mass ratio of 1.5:1.0 hydrogen peroxide to sulfide in the presence of Ferric MGDA.

Although anaerobic gas with hydrogen sulfide contamination is commonly found within industrial settings, anaerobic digesters at wastewater facilities, landfill gas and natural gas production, hydrogen sulfide is also commonly an issue within the aerobic atmosphere coming away from wastewater treatment sewerage collection systems, industrial waste transfer stations, landfill leachate collection systems, and similar situations. Treatment of aerobic gases containing hydrogen sulfide can be accomplished using a substantially identical approach as has been described herein. Hydrogen sulfide gas, in these aerobic situations, can be collected and blown up through a column with Ferric MGDA where the sulfide can be sequestered by the Ferric MGDA. The medium reaction can be monitored, adjusted, and/or controlled as described to produce elemental sulfur and the Ferric MGDA can be re-triggered and returned for re-use.

Figure 16:
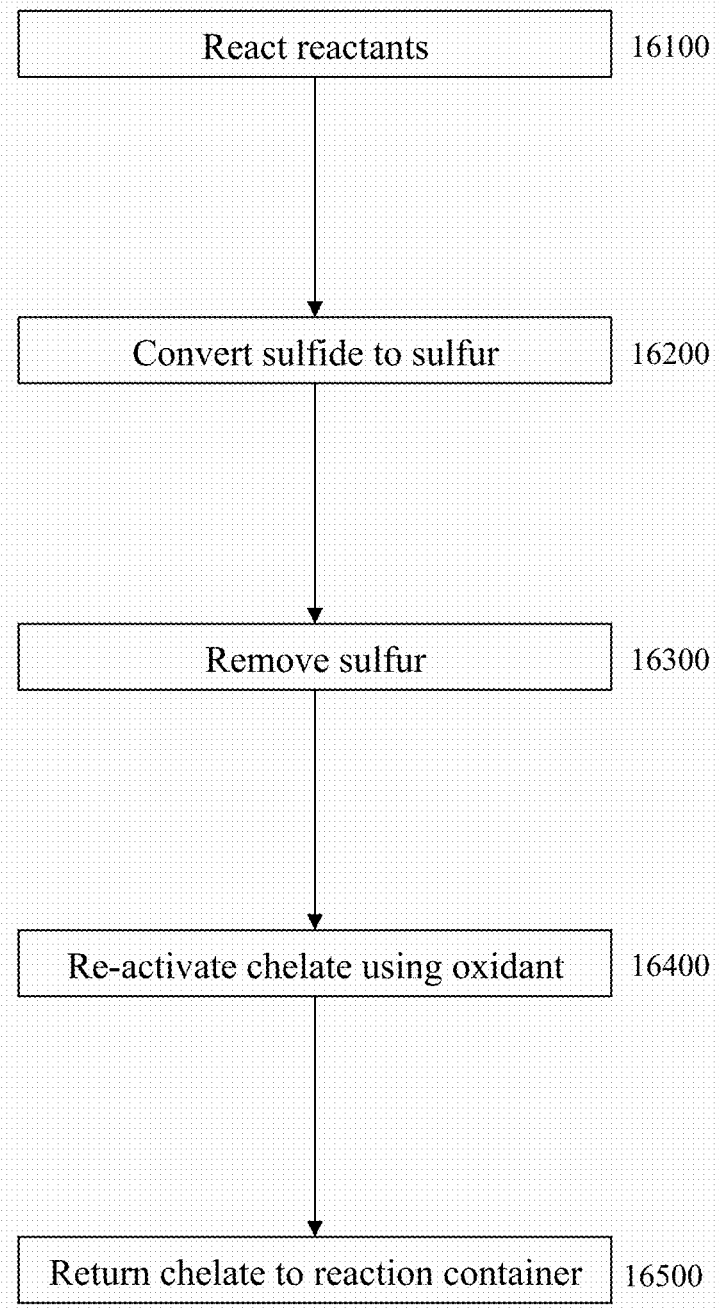
FIG. 16 is a flowchart of an exemplary embodiment of a method.
Figure 17:
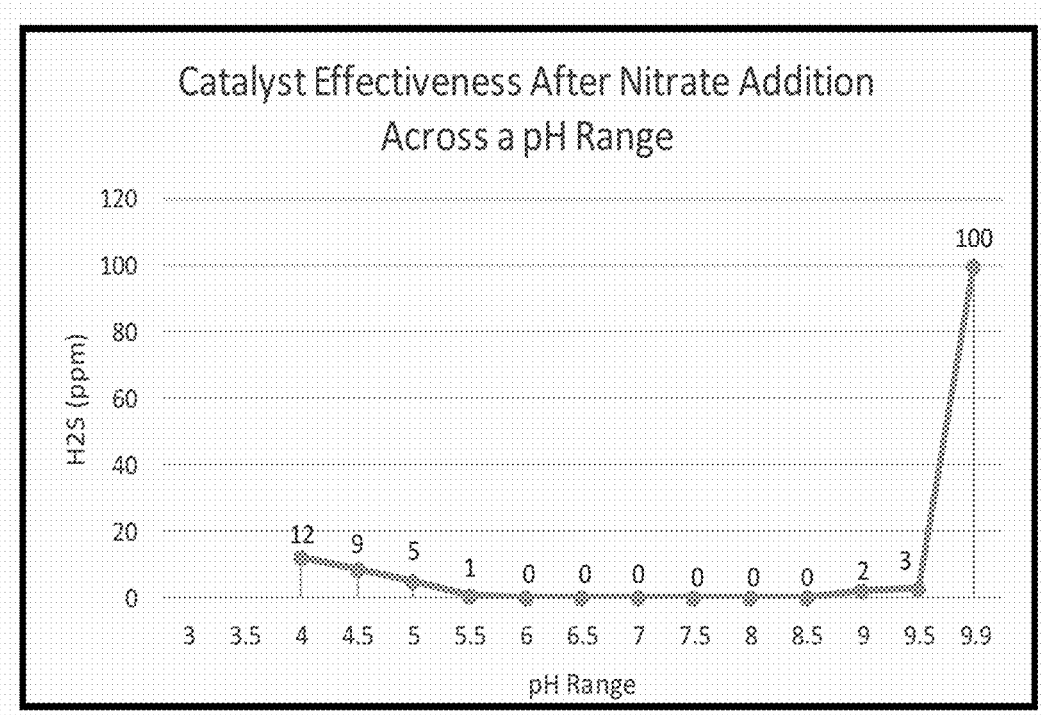
FIG. 17 is a chart of catalyst efficiency over a range of pH in the presence nitrate

FIG. 16 is a flowchart of an exemplary embodiment of a method 16000. At activity 16100, in a substantially anaerobic (or even aerobic) treatment zone of a manmade container, reactants comprising a ferric/ferrous chelate and a sour gas stream can be reacted, the sour gas stream comprising natural gas (e.g., methane, ethane, propane, and/or butane, etc.) and hydrogen sulfide at a concentration of at least 5.7 milligrams of hydrogen sulfide per cubic meter of the natural gas. At activity 16200, sequestered sulfide can be converted to elemental sulfur via one or more oxidants. At activity 16300, the elemental sulfur can be removed from an oxidation container. At activity 16400, the spent ferric/ferrous chelate can be re-activated using a reactivation composition comprising one or more oxidants selected from the group comprising: sodium percarbonate; one or more chlorite species; sodium chlorite; one or more peroxide species; hydrogen peroxide; one or more nitrate species; one or more permanganate species; one or more persulfate species; ozone; one or more chlorate species; one or more perchlorate species; one or more perborate species; nitrous oxide; 2,2 dipyridyldisulfide; peroxydisulfuric acid; and peroxymonosulfuric acid. At activity 16500, the re-activated ferric/ferrous chelate can be returned to the reaction container. Using method 16000, reaction products of the reacting can comprise: a spent ferric/ferrous chelate saturated with sulfide and/or a sweet natural gas stream having a concentration of hydrogen sulfide of no greater than 3.5 ppm. Via method 16000, a content of the treatment zone can be actively maintained at a pH of between approximately 5.55 and approximately 9.25 and an oxidation-reduction potential of between approximately −131 mV and approximately −425 mV; the ferric/ferrous chelate can comprise ferric/ferrous methylglycinediacetate (MGDA) configured with approximately one iron molecule for every five available MGDA chelate ligands; the content of the treatment zone can be actively maintained at a pH of between approximately 6.3 and approximately 9.0; the content of the treatment zone can be actively maintained at a pH of between approximately 7 and approximately 8; the content of the treatment zone can be actively maintained at an oxidation-reduction potential of between approximately −150 mV and approximately −325 mV; and/or the reactants can comprise malodorous sulfonated organic compounds.

Oxidation of iron chelate sequestered sulfide in rising pH can form sulfur dioxide, sulfite, and sulfate instead of elemental sulfur. Yet via certain exemplary embodiments, sulfide sequestered by Ferric MGDA can be efficiently and rapidly converted to elemental sulfur (instead of sulfur dioxide, sulfite, and/or sulfate) within the pH range of approximately 7.0 to approximately 7.8, by hydroxyl radicals, such as can be formed through the reaction of one or more peroxide oxidants and Ferric MGDA (which radicals and/or peroxide oxidants then can selectively oxidize the sequestered sulfide to elemental sulfur). The peroxide can be added at ratios in the range of approximately 0.5 M to approximately 1.5 M of peroxide per 1.0 M of sulfide but ideally at approximately 1.0 M peroxide to 1.0 M sulfide. The peroxide can be added as percarbonate, calcium peroxide, magnesium peroxide, hydrogen peroxide, and any other forms of peroxide that deliver H2O2.

Certain exemplary embodiments can provide a method comprising:
  in a substantially anaerobic treatment zone of a manmade container, reacting reactants comprising a ferric/ferrous chelate and a sour gas stream, the sour gas stream comprising natural gas and hydrogen sulfide at a concentration of at least 5.7 milligrams of hydrogen sulfide per cubic meter of the natural gas;
  converting the sulfide to elemental sulfur;
  removing the elemental sulfur from an oxidation container; and/or
  re-activating the spent ferric/ferrous chelate using a reactivation composition comprising one or more oxidants selected from the group comprising:
    sodium percarbonate;
    one or more chlorite species;
    sodium chlorite;
    one or more peroxide species;
    hydrogen peroxide;
    one or more nitrate species;
    one or more permanganate species;
    one or more persulfate species;
    ozone;
    one or more chlorate species;
    one or more perchlorate species;
    one or more perborate species;
    nitrous oxide;
    2,2 dipyridyldisulfide;
    peroxydisulfuric acid; and
    peroxymonosulfuric acid;
  wherein:
    reaction products of the reacting comprise:
      a spent ferric/ferrous chelate saturated with sulfide;
      a sweet gas stream having a concentration of hydrogen sulfide of no greater than 3.5 ppm;
    a content of the treatment zone is actively maintained at a pH of between approximately 5.55 and approximately 9.25 and an oxidation-reduction potential of between approximately −131 mV and approximately −425 mV;
    the ferric/ferrous chelate comprises ferric/ferrous methylglycinediacetate (MGDA) configured with approximately one iron molecule for every five available MGDA chelate ligands;
    the content of the treatment zone is actively maintained at a pH of between approximately 6.3 and approximately 9.0;
    the content of the treatment zone is actively maintained at a pH of between approximately 7 and approximately 8;
    the content of the treatment zone is actively maintained at an oxidation-reduction potential of between approximately −150 mV and approximately −325 mV; and/or
    the reactants comprise malodorous sulfonated organic compounds.

DEFINITIONS

When the following terms are used substantively herein, the accompanying definitions apply. These terms and definitions are presented without prejudice, and, consistent with the application, the right to redefine these terms via amendment during the prosecution of this application or any application claiming priority hereto is reserved. For the purpose of interpreting a claim of any patent that claims priority hereto, each definition in that patent functions as a clear and unambiguous disavowal of the subject matter outside of that definition.

a—at least one.
  acid—a compound capable of neutralizing alkalis and reddening blue litmus paper, containing hydrogen that can be replaced by a metal or an electropositive group to form a salt, or containing an atom that can accept a pair of electrons from a base. Acids are proton donors that yield hydronium ions in water solution, or electron-pair acceptors that combine with electron-pair donors or bases.
  active ferric chelate—a ferric chelate that exhibits substantial activity toward oxidation of the contaminant to be degraded, i.e., is capable of generating free radicals or other reactive oxidants from an oxidant in the presence of a medium associated with a contaminant to be treated.
  actively—via converting and/or amplifying voltages and/or currents, such as via a diode and/or transistor.
  activity—an action, act, step, and/or process or portion thereof
  adapted to—made to, designed to, and/or configured to perform a specified function.
  adjust—to change, modify, adapt, and/or alter.
  aerobic—a condition where molecular oxygen is substantially present.
  air—the earth's atmospheric gas.

aminocarboxylate—a molecule containing carboxyl functional groups bound to an amine group.

anaerobic—a condition where molecular oxygen is substantially absent.

and/or—either in conjunction with or in alternative to.

any—one, some, every, and/or all without specification.

apparatus—an appliance and/or device for a particular purpose.

approximately—about and/or nearly the same as.

aqueous oxidizing solution—any solution comprising an oxidizing agent and water.

are—to exist.

associate—to join, connect together, accompany, and/or relate.

associated with—related to and/or accompanying.

at—in, on, and/or near.

at least—not less than, and possibly more than.

available—obtainable, not busy, not otherwise committed, accessible, present, suitable, and/or ready for use and/or service.

between—in a separating interval and/or intermediate to.

biosolids—stabilized and/or unstabilized solid, semisolid, and/or slurried residuals generated by the biological treatment of sewage, petroleum refining waste, and/or industrial chemical manufacturing wastewater.

can—is capable of, in at least some embodiments.

cause—to bring about, provoke, precipitate, produce, elicit, be the reason for, result in, and/or effect.

chelating agent (a.k.a. "chelate")—a heterocyclic compound having a central metallic ion attached by coordinate and/or covalent bonds to two or more nonmetallic atoms in the same molecule.

chlorate—any salt of chloric acid, and containing the radical and/or monovalent ion $ClO_3^-$.

composition—a composition of matter and/or an aggregate, mixture, reaction product, and/or result of combining two or more substances.

compound—a pure, macroscopically homogeneous substance consisting of atoms or ions of two or more different elements in definite proportions that cannot be separated by physical methods. A compound usually has properties unlike those of its constituent elements.

compress—to decrease the volume of air and/or other gas by the application of pressure.

comprises—includes, but is not limited to, what follows.

comprising—including but not limited to.

concentration—a measure of how much of a given substance is mixed, dissolved, contained, and/or otherwise present in and/or with another substance; and/or a measure of the amount of dissolved substance contained per unit of volume and/or the amount of a specified substance in a unit amount of another substance.

configure—to design, arrange, set up, shape, and/or make suitable and/or fit for a specific purpose, function, use, and/or situation.

contact—to touch and/or come together.

container—an enclosure adapted to constrain a flow of a fluid.

containing—including but not limited to.

contaminant—any substance that can be oxidized, such as, for example, a chemical compound, chemical mixture, organic compound, inorganic compound, hydrogen sulfide, and/or biological, etc. As a further example, the contaminant can be an organic compound, an organic compound having at least one aromatic functional group, and/or an organic compound having at least one aliphatic functional group, etc.

content—that which fills and/or is substantially contained by.

convert—to transform, adapt, and/or change.

converting—the act of transforming.

corresponding—related, associated, accompanying, similar in purpose and/or position, conforming in every respect, and/or equivalent and/or agreeing in amount, quantity, magnitude, quality, and/or degree.

create—to make, form, produce, generate, bring into being, and/or cause to exist.

cubic—shaped in a manner resembling a cube.

cycle—a set of predetermined activities.

define—to establish the meaning, relationship, outline, form, and/or structure of; and/or to precisely and/or distinctly describe and/or specify.

determine—to find out, obtain, calculate, decide, deduce, ascertain, and/or come to a decision, typically by investigation, reasoning, and/or calculation.

device—a machine, manufacture, and/or collection thereof different—changed, distinct, and/or separate.

diffuse—to widely spread and/or scatter.

during—at some time in a time interval.

EDTA—ethylenediaminetetracetic acid.

effective—sufficient to bring about, provoke, elicit, and/or cause.

elemental—of, relating to, or denoting a chemical element.

embodiment—an implementation, manifestation, and/or a concrete representation, such as of a concept.

enter—to come and/or flow into.

environment—all external conditions that affect an organism or other specified system during its lifetime.

estimate—(n) a calculated value approximating an actual value; (v) to calculate and/or determine approximately and/or tentatively.

exemplary—serving as an example, model, instance, and/or illustration.

ferric—of, relating to, and/or containing iron, especially with valence 3 and/or in its plus-three oxidation state, Fe(III) (sometimes designated $Fe^{3+}$) and/or a valence higher than in a corresponding ferrous compound.

ferric chelate—any organic and inorganic polydentate ligand complexed with ferric ion, Fe(III), and/or ferrous ion, Fe(II), including the ferro aminocarboxylates (such as ferric/ferrous MGDA, ferric/ferrous EDTA, ferric/ferrous HEIDA, and/or ferric/ferrous NTA, etc.), ferric/ferrous gluconate, etc.

ferric/ferrous—ferric and/or ferrous.

ferro—iron containing and/or ferric and/or ferrous.

ferrous—of or containing iron, especially with valence 2 and/or in its plus-two oxidation state, Fe(II) (sometimes designated $Fe^{e^1}$) and/or a valence lower than in a corresponding ferric compound.

flow—to stream and/or continuously transfer.

for—with a purpose of.

from—used to indicate a source, origin, and/or location thereof further—in addition.

gas—a substance in a gaseous state, that is, in a state of matter distinguished from the solid and liquid states by relatively low density and viscosity, relatively great expansion and contraction with changes in pressure and temperature, the ability to diffuse readily, and the spontaneous tendency to become distributed uniformly throughout any container; and/or a substance in a gaseous state.

generate—to create, produce, render, give rise to, and/or bring into existence.

gluconate—any salt or ester of gluconic acid greater than—larger and/or more than.

having—possessing, characterized by, comprising, and/or including but not limited to.

HEIDA—hydroxyethyliminodiacetic acid hydrogen sulfide—a colorless poisonous gas with a smell of rotten eggs, made by the action of acids on sulfides.

including—having, but not limited to, what follows.

initialize—to prepare something for use and/or some future event.

inject—to place into an orbit, trajectory, and/or stream.

into—to a condition, state, or form of.

introduce—to insert, inject, and/or put inside and/or into.

ion—an electrically charged atom or group of atoms formed by the loss or gain of one or more electrons, as a cation (positive ion), which is created by electron loss and is attracted to the cathode in electrolysis, or as an anion (negative ion), which is created by an electron gain and is attracted to the anode. The valence of an ion is equal to the number of electrons lost or gained and is indicated by a plus sign for cations and a minus sign for anions, thus: Na+, Cl–l–, Ca++, S iron—a silvery-white, lustrous, malleable, ductile, magnetic or magnetizable, metallic element occurring abundantly in combined forms, notably in hematite, limonite, magnetite, and taconite, and used alloyed in a wide range of important structural materials. Atomic number 26; atomic weight 55.845; melting point 1,535° C.; boiling point 2,750° C.; specific gravity 7.874 (at 20° C.); valence 2, 3, 4, 6.

is—to exist in actuality.

less than—having a measurably smaller magnitude and/or degree as compared to something else.

ligand—an ion, a molecule, or a molecular group that binds to another chemical entity to form a larger complex maintain—to retain, preserve, sustain, keep in an existing state, and/or continue to obtain.

malodorous—having a bad and/or foul odor.

manmade—a tangible physical item that is synthetic and/or made by humans rather than occurring in nature.

mass-to-mass ratio—the mass of a first substance expressed with respect to the mass of a second substance.

may—is allowed and/or permitted to, in at least some embodiments.

medium—any substance or material, such as one or more solids, liquids, vapors, fluids, water, and/or air, etc.

meter—a device adapted to detect and/or record a measured value.

method—one or more acts that are performed upon subject matter to be transformed to a different state or thing and/or are tied to a particular apparatus, said one or more acts not a fundamental principal and not pre-empting all uses of a fundamental principal.

MGDA—Methyl Glycine Di-Acetate, methylglycinediacetate, and/or trisodium methylglycinediacetate.

milligram—One one-thousandth of a gram.

mix—to combine and/or blend into one mass, stream, and/or mixture.

molecule—the smallest particle of a substance that retains the chemical and physical properties of the substance and is composed of two or more atoms; and/or a group of like or different atoms held together by chemical forces.

more—a quantifier meaning greater in size, amount, extent, and/or degree.

mV—milliVolts.

natural gas—a flammable gas, consisting largely of methane and other hydrocarbons, occurring naturally underground (often in association with petroleum) and used as fuel.

nitrate—the univalent radical NO3 or a compound containing it, as a salt or an ester of nitric acid.

nitrate/nitrite—nitric acid, nitrous acid, and/or any salt, ester, alcohol, and/or oxidized ion of nitric acid or nitrous acid, having the molecular formula $NO^{3-}$ or $NO^{2-}$, such as calcium nitrate, sodium nitrate, ammonium nitrate, potassium nitrate, sodium nitrite, potassium nitrite, ammonium nitrite, and/or calcium nitrite, etc.

nitrite—the univalent radical NO2 or a compound containing it, such as a salt or an ester of nitrous acid.

nitrous oxide—a colourless nonflammable slightly soluble gas with a sweet smell that is used as an anaesthetic in dentistry and surgery and has the formula $N_2O$.

no—an absence of and/or lacking any.

NTA—nitrilotriacetic acid occur—to happen, take place, and/or come about.

one—being or amounting to a single unit, individual, and/or entire thing, item, and/or object.

operable—practicable and/or fit, ready, and/or configured to be put into its intended use and/or service.

or—a conjunction used to indicate alternatives, typically appearing only before the last item in a group of alternative items.

organic—a compound containing carbon, which is further characterized by the presence in the molecule of two carbon atoms bonded together; or one atom of carbon bonded to at least one atom of hydrogen or halogen; or one atom of carbon bonded to at least one atom of nitrogen by a single or double bond.

oxidation—a chemical reaction in which an atom or ion loses electrons, thus undergoing an increase in valence, e.g., removing an electron from an iron atom having a valence of +2 changes the valence to +3.

oxidation-reduction—a reversible chemical process usually involving the transfer of electrons, in which one reaction is an oxidation and the reverse reaction is a reduction.

oxidation-reduction potential—in aqueous solutions, a measure of the tendency of the solution to either gain or lose electrons when it is subject to change by introduction of a new species.

oxide—any compound of oxygen with another element.

oxidize—to undergo and/or cause to undergo a chemical reaction and/or combination with oxygen; to convert (an element) into an oxide; to form and/or cause to form a layer of metal oxide, as in rusting; to add oxygen and/or any nonmetal; to lose and/or cause to lose hydrogen atoms; and/or to undergo and/or cause to undergo a decrease in the number of electrons, thereby increasing the valence.

oxidizing agent ("oxidant")—a substance, such as a hydrogen peroxide, calcium peroxide, magnesium peroxide, ozone, persulfate, chlorite, hypochlorite, chlorine, bromine, permanganate, peracetic acid, and/or chlorine dioxide, that oxidizes another substance, usually by accepting electrons.

oxygen—a nonmetallic element, which constitutes approximately 21 percent of the earth's atmosphere by volume, which occurs as a diatomic gas, O2, and which is assigned atomic number 8, and has atomic weight 15.9994.

ozone—an allotrope of oxygen, O3. Ozone is a relatively reactive oxidizing agent that can be used to purify water.

per—for each and/or by means of perborate—any of certain salts derived, or apparently derived, from perboric acid and containing the radical and/or ion $BO_3$.

perchlorate—any salt or ester of perchloric acid and/or containing the radical and/or ion $ClO_4^-$.

permanganate—any of the salts of permanganic acid, all of which are strong oxidizing agents.

peroxide—a compound containing a bivalent —OO— group in the molecule.

persulfate—a sulphate of the peroxide of any base.

pH—a measure representing the base 10 logarithm of the reciprocal of hydrogen ion concentration in gram atoms per liter, used to express the acidity or alkalinity of a solution on a scale of 0 to 14, where less than 7 represents acidity, 7 neutrality, and more than 7 alkalinity.

plurality—the state of being plural and/or more than one.

portion—a part, component, section, percentage, ratio, and/or quantity that is less than a larger whole.

ppm—parts per million.

predetermine—to determine, decide, and/or establish in advance.

prevent—to hinder, avert, and/or keep from occurring.

prior—before and/or preceding in time or order.

probability—a quantitative representation of a likelihood of an occurrence.

product—something produced by human or mechanical effort or by a natural process.

project—to calculate, estimate, or predict.

provide—to furnish, supply, give, convey, send, and/or make available.

pure—having a substantially homogeneous and/or uniform composition, not mixed, and/or substantially free of foreign substances.

range—a measure of an extent of a set of values and/or an amount and/or extent of variation.

ratio—a relationship between two quantities expressed as a quotient of one divided by the other.

re-activate—to make active again and/or to restore the ability to function and/or the effectiveness of react—to cause (a substance or substances) to undergo a reaction.

reactants—substances that react in a chemical reaction.

reaction—a change and/or transformation in which a substance decomposes, combines with other substances, and/or interchanges constituents with other substances.

reaction product—something produced by a chemical reaction.

receive—to get as a signal, take, acquire, and/or obtain.

recommend—to suggest, praise, commend, and/or endorse.

reduce—to make and/or become lesser and/or smaller.

remove—to eliminate, remove, and/or delete, and/or to move from a place or position occupied.

repeat—to do again and/or perform again.

repeatedly—again and again; repetitively.

request—to express a desire for and/or ask for.

result—(n.) an outcome and/or consequence of a particular action, operation, and/or course; (v.) to cause an outcome and/or consequence of a particular action, operation, and/or course.

said—when used in a system or device claim, an article indicating a subsequent claim term that has been previously introduced.

salt—a chemical compound formed by replacing all or part of the hydrogen ions of an acid with metal ions and/or electropositive radicals.

saturated—full and/or unable to hold and/or contain more.

select—to make a choice and/or selection from alternatives.

set—a related plurality of predetermined elements; and/or one or more distinct items and/or entities having a specific common property or properties.

sodium chlorite—an explosive, white, mildly hygroscopic, water-soluble powder, having the formula $NaClO_2$, that decomposes at 175° C. and is used as an analytical reagent and oxidizing agent.

sodium percarbonate—a colorless, crystalline, hygroscopic, and water-soluble solid adduct of sodium carbonate and hydrogen peroxide (a perhydrate), with formula 2Na2CO3.3H2O2.

sour gas—natural gas that contains greater than approximately 5.7 milligrams of H2S per cubic meter (ppm), which is roughly equivalent to 4 parts per million by volume under standard temperature and pressure.

source—an compound comprising and/or capable of generating.

species—a class of individuals and/or objects grouped by virtue of their common attributes and assigned a common name; a division subordinate to a genus.

spent—used up, consumed, exhausted, and/or depleted of effectiveness.

state—a qualitative and/or quantitative description of condition.

stream—a steady current of a fluid.

substantially—to a considerable, large, and/or great, but not necessarily whole and/or entire, extent and/or degree.

sulfide—any compound of sulfur and another element, the compound containing the sulfur 2– ion or sulfur with an oxidation state of –2.

sulfonate—an ester or salt of sulfonic acid.

sulfur—A pale yellow nonmetallic element, occurring widely in nature in several free and combined allotropic forms, which is used in black gunpowder, rubber vulcanization, the manufacture of insecticides and pharmaceuticals, and in the preparation of sulfur compounds such as hydrogen sulfide and sulfuric acid, and which has: atomic number 16; atomic weight 32.066; melting point (rhombic) 112.8° C., (monoclinic) 119.0° C.; boiling point 444.6° C.; specific gravity (rhombic) 2.07, (monoclinic) 1.957; and valence 2, 4, 6.

sweet gas—natural gas that contains less than approximately 5.7 milligrams of H2S per cubic meter (ppm), which is roughly equivalent to 4 parts per million by volume under standard temperature and pressure.

system—a collection of mechanisms, devices, machines, articles of manufacture, processes, data, and/or instructions, the collection designed to perform one or more specific functions.

that—used as the subject or object of a relative clause.

through—across, among, between, and/or in one side and out the opposite and/or another side of.

to—a preposition adapted for use for expressing purpose.

transform—to change in measurable: form, appearance, nature, and/or character.

transmit—to send as a signal, provide, furnish, and/or supply.

treatment—an act, manner, or method of handling and/or dealing with someone and/or something.

use—to put into service.

via—by way of and/or utilizing.

wastewater—liquid and/or waterborne wastes generated by residential, commercial, and/or industrial operations, and potentially including sewage, excrement, dissolved solids, suspended solids, surface water, storm water, and/or groundwater.

weight—a force with which a body is attracted to Earth or another celestial body, equal to the product of the object's mass and the acceleration of gravity; and/or a factor and/or value assigned to a number in a computation, such as in determining an average, to make the number's effect on the computation reflect its importance, significance, preference, impact, etc.

when—at a time and/or during the time at which.

wherein—in regard to which; and; and/or in addition to.

with—accompanied by.

within—inside the limits of.

zone—a region and/or volume having at least one predetermined boundary.

Note

Various substantially and specifically practical and useful exemplary embodiments of the claimed subject matter are described herein, textually and/or graphically, including the best mode, if any, known to the inventor(s), for implementing the claimed subject matter by persons having ordinary skill in the art. Any of numerous possible variations (e.g., modifications, augmentations, embellishments, refinements, and/or enhancements, etc.), details (e.g., species, aspects, nuances, and/or elaborations, etc.), and/or equivalents (e.g., substitutions, replacements, combinations, and/or alternatives, etc.) of one or more embodiments described herein might become apparent upon reading this document to a person having ordinary skill in the art, relying upon his/her expertise and/or knowledge of the entirety of the art and without exercising undue experimentation. The inventor(s) expects skilled artisans, after obtaining authorization from the inventor(s), to implement such variations, details, and/or equivalents as appropriate, and the inventor(s) therefore intends for the claimed subject matter to be practiced other than as specifically described herein. Accordingly, as permitted by law, the claimed subject matter includes and covers all variations, details, and equivalents of that claimed subject matter. Moreover, as permitted by law, every combination of the herein described characteristics, functions, activities, substances, and/or structural elements, and all possible variations, details, and equivalents thereof, is encompassed by the claimed subject matter unless otherwise clearly indicated herein, clearly and specifically disclaimed, or otherwise clearly inoperable or contradicted by context.

The use of any and all examples, or exemplary language (e.g., "such as") provided herein, is intended merely to better illuminate one or more embodiments and does not pose a limitation on the scope of any claimed subject matter unless otherwise stated. No language herein should be construed as indicating any non-claimed subject matter as essential to the practice of the claimed subject matter.

Thus, regardless of the content of any portion (e.g., title, field, background, summary, description, abstract, drawing figure, etc.) of this document, unless clearly specified to the contrary, such as via explicit definition, assertion, or argument, or clearly contradicted by context, with respect to any claim, whether of this document and/or any claim of any document claiming priority hereto, and whether originally presented or otherwise:

there is no requirement for the inclusion of any particular described characteristic, function, activity, substance, or structural element, for any particular sequence of activities, for any particular combination of substances, or for any particular interrelationship of elements;

no described characteristic, function, activity, substance, or structural element is "essential";

any two or more described substances can be mixed, combined, reacted, separated, and/or segregated;

any described characteristics, functions, activities, substances, and/or structural elements can be integrated, segregated, and/or duplicated;

any described activity can be performed manually, semi-automatically, and/or automatically;

any described activity can be repeated, any activity can be performed by multiple entities, and/or any activity can be performed in multiple jurisdictions; and any described characteristic, function, activity, substance, and/or structural element can be specifically excluded, the sequence of activities can vary, and/or the interrelationship of structural elements can vary.

The use of the terms "a", "an", "said", "the", and/or similar referents in the context of describing various embodiments (especially in the context of the following claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

When any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate sub-range defined by such separate values is incorporated into the specification as if it were individually recited herein. For example, if a range of 1 to 10 is described, that range includes all values therebetween, such as for example, 1.1, 2.5, 3.335, 5, 6.179, 8.9999, etc., and includes all sub-ranges therebetween, such as for example, 1 to 3.65, 2.8 to 8.14, 1.93 to 9, etc., even if those specific values or specific sub-ranges are not explicitly stated.

When any phrase (i.e., one or more words) appearing in a claim is followed by a drawing element number, that drawing element number is exemplary and non-limiting on claim scope.

No claim of this document is intended to invoke 35 USC 112 paragraph six (or paragraph f) unless the precise phrase "means for" is followed by a gerund.

Any information in any material (e.g., a United States patent, United States patent application, book, article, web page, etc.) that has been incorporated by reference herein, is incorporated by reference herein in its entirety to its fullest enabling extent permitted by law yet only to the extent that no conflict exists between such information and the other definitions, statements, and/or drawings set forth herein. In the event of such conflict, including a conflict that would render invalid any claim herein or seeking priority hereto, then any such conflicting information in such material is specifically not incorporated by reference herein. Any specific information in any portion of any material that has been incorporated by reference herein that identifies, criticizes, or compares to any prior art is not incorporated by reference herein.

Applicant intends that each claim presented herein and at any point during the prosecution of this application, and in any application that claims priority hereto, defines a distinct patentable invention and that the scope of that invention must change commensurately if and as the scope of that claim changes during its prosecution. Thus, within this document, and during prosecution of any patent application related hereto, any reference to any claimed subject matter is intended to reference the precise language of the then-pending claimed subject matter at that particular point in time only.

Accordingly, every portion (e.g., title, field, background, summary, description, abstract, drawing figure, etc.) of this document, other than the claims themselves and any provided definitions of the phrases used therein, is to be regarded as illustrative in nature, and not as restrictive. The scope of subject matter protected by any claim of any patent that issues based on this document is defined and limited only by the precise language of that claim (and all legal equivalents thereof) and any provided definition of any phrase used in that claim, as informed by the context of this document.

What is claimed is:

1. A method comprising:
    in a substantially anaerobic treatment zone of a manmade container, reacting reactants comprising a ferric/ferrous chelate and a sour gas stream, the sour gas stream comprising natural gas and hydrogen sulfide at a concentration of at least 5.7 milligrams of hydrogen sulfide per cubic meter of the natural gas, wherein:
        reaction products of the reacting comprise:
            a spent ferric/ferrous chelate saturated with sulfide; and
            a sweet gas stream having a concentration of hydrogen sulfide of no greater than 3.5 ppm;
        a content of the treatment zone is actively maintained at a pH of between approximately 5.55 and approximately 9.25 and an oxidation-reduction potential of between approximately −131 mV and approximately −425 mV.

2. The method of claim 1, further comprising converting the sulfide to elemental sulfur.

3. The method of claim 1, further comprising removing elemental sulfur from an oxidation container.

4. The method of claim 1, further comprising, via a predetermined reactivation composition comprising a predetermined oxidant, re-activating the spent ferric/ferrous chelate.

5. The method of claim 1, further comprising re-activating the spent ferric/ferrous chelate using a reactivation composition comprising sodium percarbonate.

6. The method of claim 1, further comprising re-activating the spent ferric/ferrous chelate using a reactivation composition comprising one or more chlorite species.

7. The method of claim 1, further comprising re-activating the spent ferric/ferrous chelate using a reactivation composition comprising sodium chlorite.

8. The method of claim 1, further comprising re-activating the spent ferric/ferrous chelate using a reactivation composition comprising one or more peroxide species.

9. The method of claim 1, further comprising re-activating the spent ferric/ferrous chelate using a reactivation composition comprising hydrogen peroxide.

10. The method of claim 1, further comprising re-activating the spent ferric/ferrous chelate using a reactivation composition comprising one or more nitrate species.

11. The method of claim 1, further comprising re-activating the spent ferric/ferrous chelate using a reactivation composition comprising one or more permanganate species.

12. The method of claim 1, further comprising re-activating the spent ferric/ferrous chelate using a reactivation composition comprising one or more persulfate species.

13. The method of claim 1, further comprising re-activating the spent ferric/ferrous chelate using a reactivation composition comprising ozone.

14. The method of claim 1, further comprising re-activating the spent ferric/ferrous chelate using a reactivation composition comprising one or more chlorate species.

15. The method of claim 1, further comprising re-activating the spent ferric/ferrous chelate using a reactivation composition comprising one or more perchlorate species.

16. The method of claim 1, further comprising re-activating the spent ferric/ferrous chelate using a reactivation composition comprising one or more perborate species.

17. The method of claim 1, further comprising re-activating the spent ferric/ferrous chelate using a reactivation composition comprising nitrous oxide.

18. The method of claim 1, further comprising re-activating the spent ferric/ferrous chelate using a reactivation composition comprising one or more reactivators selected from 2,2 dipyridyldisulfide, peroxydisulfuric acid and peroxymonosulfuric acid.

19. The method of claim 1, wherein the ferric/ferrous chelate comprises ferric/ferrous methylglycinediacetate (MGDA) configured with approximately one iron molecule for every five available MGDA chelate ligands.

20. The method of claim 1, wherein the content of the treatment zone is actively maintained at a pH of between approximately 6.3 and approximately 9.0.

21. The method of claim 1, wherein the content of the treatment zone is actively maintained at a pH of between approximately 7 and approximately 8.

22. The method of claim 1, wherein the content of the treatment zone is actively maintained at an oxidation-reduction potential of between approximately −150 mV and approximately −325 mV.

23. The method of claim 1, wherein the reactants comprise malodorous sulfonated organic compounds.

* * * * *